United States Patent
Marhoefer

(10) Patent No.: US 9,300,141 B2
(45) Date of Patent: Mar. 29, 2016

(54) VIRTUAL POWER PLANT SYSTEM AND METHOD INCORPORATING RENEWAL ENERGY, STORAGE AND SCALABLE VALUE-BASED OPTIMIZATION

(76) Inventor: John J. Marhoefer, Chicago, IL (US)

(*) Notice: Subject to any disclaimer, the term of this patent is extended or adjusted under 35 U.S.C. 154(b) by 908 days.

(21) Appl. No.: 13/299,052

(22) Filed: Nov. 17, 2011

(65) Prior Publication Data

US 2012/0130556 A1 May 24, 2012

Related U.S. Application Data

(60) Provisional application No. 61/415,002, filed on Nov. 18, 2010.

(51) Int. Cl.
| | |
|---|---|
| G06F 1/28 | (2006.01) |
| H02J 3/38 | (2006.01) |
| H02J 3/32 | (2006.01) |
| G06Q 10/04 | (2012.01) |
| G06Q 50/06 | (2012.01) |
| H02J 3/14 | (2006.01) |

(52) U.S. Cl.
CPC .............. H02J 3/386 (2013.01); G06Q 10/04 (2013.01); G06Q 50/06 (2013.01); H02J 3/32 (2013.01); H02J 3/383 (2013.01); *H02J 2003/146* (2013.01); *Y02B 10/14* (2013.01); *Y02E 10/563* (2013.01); *Y02E 10/566* (2013.01); *Y02E 10/763* (2013.01); *Y02E 70/30* (2013.01); *Y04S 50/00* (2013.01)

(58) Field of Classification Search
USPC .......................................................... 700/2
See application file for complete search history.

(56) References Cited

U.S. PATENT DOCUMENTS

| | | | |
|---|---|---|---|
| 4,731,547 | A | 3/1988 | Alenduff et al. |
| 5,430,430 | A | 7/1995 | Gilbert |
| 5,466,793 | A | 11/1995 | Grifioen |
| 6,424,115 | B1 | 7/2002 | Holl et al. |
| 6,785,592 | B1 | 8/2004 | Smith et al. |
| 6,925,361 | B1 | 8/2005 | Sinnock |
| 6,925,363 | B2 | 8/2005 | Hutton |
| 7,141,321 | B2 | 11/2006 | McArthur et al. |
| 7,194,318 | B2 | 3/2007 | Attarwala |
| 7,239,044 | B1 | 7/2007 | Atcitty et al. |
| 7,274,975 | B2 | 9/2007 | Miller |

(Continued)

OTHER PUBLICATIONS

International Search Report and Written Opinion Issued in International Patent Application No. PCT/US2011/061216 on Mar. 16, 2012.

*Primary Examiner* — Mohammad Ali
*Assistant Examiner* — Emilio J Saavedra
(74) *Attorney, Agent, or Firm* — Barnes & Thornburg LLP

(57) ABSTRACT

Methods and systems provided for creating a scalable building block for a virtual power plant, where individual buildings can incorporate on-site renewable energy assets and energy storage and optimize the acquisition, storage and consumption of energy in accordance with a value hierarchy. Each building block can be aggregated into a virtual power plant, in which centralized control of load shifting in selected buildings, based on predictive factors or price signals, can provide bulk power for ancillary services or peak demand situations. Aggregation can occur at multiple levels, including developments consisting of both individual and common renewable energy and storage assets. The methods used to optimize the system can also be applied to "right size" the amount of renewable energy and storage capacity at each site to maximize return on the capital investment.

27 Claims, 11 Drawing Sheets

(56) References Cited

U.S. PATENT DOCUMENTS

| | | |
|---|---|---|
| 7,373,222 B1 | 5/2008 | Wright et al. |
| 7,388,364 B2 | 6/2008 | Schweigert et al. |
| 7,430,459 B1 | 9/2008 | Papalia et al. |
| 7,489,989 B2 | 2/2009 | Sukhanov et al. |
| 7,590,472 B2 | 9/2009 | Hakim et al. |
| 7,612,466 B2 | 11/2009 | Skutt |
| 7,660,649 B1 * | 2/2010 | Hope ............... G06Q 10/04 700/28 |
| 2003/0182250 A1 | 9/2003 | Shahidehpour |
| 2004/0054564 A1 | 3/2004 | Fonseca et al. |
| 2005/0006958 A1 | 1/2005 | Dubovsky |
| 2005/0120904 A1 * | 6/2005 | Kumar et al. ................ 105/35 |
| 2005/0222855 A1 | 10/2005 | Brunson |
| 2006/0168546 A1 * | 7/2006 | Consolatti ........ G06Q 10/06 715/853 |
| 2006/0208571 A1 | 9/2006 | Fairlie |
| 2006/0276938 A1 | 12/2006 | Miller |
| 2007/0282495 A1 | 12/2007 | Kempton et al. |
| 2008/0262857 A1 | 10/2008 | Perera |
| 2009/0012916 A1 | 1/2009 | Barnett |
| 2009/0040029 A1 | 2/2009 | Bridges et al. |
| 2009/0048716 A1 * | 2/2009 | Marhoefer ............... 700/291 |
| 2009/0189456 A1 | 7/2009 | Skutt |
| 2009/0234521 A1 | 9/2009 | Kumar et al. |
| 2009/0240380 A1 * | 9/2009 | Shah et al. ............... 700/295 |
| 2009/0292402 A1 | 11/2009 | Cruikshank, Iii |
| 2009/0319090 A1 | 12/2009 | Dillon et al. |
| 2010/0076835 A1 | 3/2010 | Silverman |

* cited by examiner

VIRTUAL POWER PLANT SYSTEM AND METHOD INCORPORATING RENEWAL ENERGY, STORAGE AND SCALABLE VALUE-BASED OPTIMIZATION

CROSS REFERENCE TO RELATED APPLICATIONS

This application claims the benefit of priority under 35 U.S.C. §119(e) to U.S. Provisional Application Ser. No. 61/415,002, filed Nov. 18, 2010. The disclosures set forth in the referenced-application is incorporated herein by reference in its entirety.

FIELD OF TECHNOLOGY

The present disclosure relates generally to the field of energy control and management, and more particularly, to various computer-based systems and methods for managing the implementation, inclusion and aggregation of distributed renewable energy sources and energy storage in the electric grid in a way that maximizes and optimizes energy distribution, and hence value for the asset owners, aggregators, utilities and regional transmission organizations (RTOs).

BACKGROUND

A fundamental challenge of the current electricity infrastructure is incorporating renewable energy sources into the existing grid to make it cheaper, cleaner, more efficient and more reliable. A number of factors make this problem particularly vexing. First, the grid must be have enough generation capacity to accommodate peak demand—days (and hours) when aggregate electricity demand is highest—even though there may be only ten "peak demand" days each year. This means that "pure peaker" power plants (usually fueled by natural gas or diesel) that come on line only to satisfy peak demand remain idle the rest of the year; renewable energy sources like solar and wind power, which are intermittent and unreliable, cannot be used as a substitute.

Second, the daily output of solar and wind can be predicted but it cannot be guaranteed, which makes them poor candidates to supply baseload or load following electricity generation the way conventional fuels (coal, nuclear and natural gas) do.

Third, wind and solar have low inertia; power generated by these sources can be online (or offline) almost instantly. Conversely, a coal or nuclear power plant may require several days to completely cycle up or down, and a load-following natural gas power plant may require 30 to 90 minutes. Thus, one cannot shut off a conventional power plant just because the wind is blowing, or conversely, bring it back online immediately just because the wind has calmed.

Fourth, solar and wind, even though they are highly complementary, do not track well with daily and seasonal demand. On a daily basis, solar generally tracks well with peak demand and thus rates, although solar production tends to decline when demand and prices are highest (e.g., 4 p.m.-6 p.m.). On a seasonal basis, solar energy presents a conundrum in terms of the optimal amount of capacity to install. Electricity use is generally highest in summer (when daily solar radiation begins to decline from its June peak), followed by winter (when solar radiation is lowest), and demand is lowest during the temperate seasons of spring and fall. Thus, installing enough solar capacity to meet electricity demand during summer and winter will result in significant excess capacity in spring and fall. Conversely, installing adequate solar capacity to meet spring and fall demand will result in supply shortfalls during summer and winter months when demand and prices are generally highest.

The value of excess capacity during low demand seasons (spring and fall) is generally low because baseload generation combined with some load-following generation—the two lowest cost tiers of conventional electricity generation—is usually adequate to supply demand. Wind has the opposite problem. It tends to be more available during off-peak times and seasons (e.g., night and winter), and less available during peak times and seasons (daylight hours and summer). When combined, solar and wind can generally provide coverage for all seasons and times of day, but their lack of reliability compared with conventional fuel sources makes this problematic without the ability to store excess capacity from these sources on a large scale.

Fifth, the electric grid has daily needs for ancillary services—typically, multiple intervals on given days when power must be added to or taken off the grid in a matter of seconds to regulate voltage or ensure adequate spinning reserves. Renewable energy sources, given their intermittency, cannot provide power or reduce load when called upon and in fact may exacerbate regulation and reserve challenges because of their inherent volatility and low inertia.

For these reasons, the inclusion of wind and solar into the current grid creates significant volatility issues for price, reserve power and voltage regulation—a problem that will become worse are more renewable energy sources are brought online. Because these renewable energy sources are both intermittent and low inertia, they can create significant disruption to the methodical generation hierarchy of baseload, load following and pure peaker power plants, resulting in significant price volatility. A good example is Texas, which has significant installed wind power capacity and limited capability to acquire or dispatch electricity out of state. Texas also has an aggressive renewable portfolio standard (RPS), which mandated that utilities generate 2,000 megawatts (equivalent to a large nuclear power plant) of new renewable power (primarily wind power) by 2009. The result has been significant volatility in wholesale electricity market prices. In 2009, Texas' average daily spread between minimum and maximum hourly market prices was 22 cents per kilowatt-hour for the Houston market. In 2008 this spread was 41 cents per kWh. (The annual decline can be attributed to significantly reduced electricity demand as a result of the "Great Recession.") During certain hours, the market price for electricity is negative 150 cents per kWh; these situations occur when significant wind power is online and baseload and load following plants are offline for maintenance or cannot cycle down quickly enough to accommodate the excess capacity.

Similarly, electricity providers must keep electricity in reserve to provide for supply disruptions or demand spikes, and they must regulate voltage and keep it steady. Both imperatives are difficult when renewable sources of power come on and off line abruptly. If the current transmission state includes a significant amount of wind-generated electricity, and the wind stops blowing suddenly, some power reserve must be capable of filling the void immediately to provide demanded power and prevent significant drops in voltage that could result in brown outs. Conversely, if a significant supply of wind or solar comes online suddenly, then a rapid means of absorbing this electricity must be available to avoid overvoltage situations.

These volatility issues pertaining to electricity supply and demand, as well as ancillary services, create significant opportunities for energy optimization. Optimization of electricity supply and demand is not a new concept. Generally, however, optimization has focused on demand side management (DSM), also known as demand response (DR), in which incorporation of renewable energy has been an afterthought. This is true even when DSM-based optimization includes an energy storage component. DSM focuses on reducing demand during peak times—usually, the same times that "pure peaker" plants must be brought online—and has two components: peak shaving and load shifting. Peak shaving focuses on reducing consumption; a typical example is raising one's thermostat a few degrees on a hot summer day.

Load shifting focuses on deferring electric consumption that is necessary but for which timing is discretionary; typical examples include electric clothes drying or running the dishwasher. DSM can result from voluntary measures, automated processes or a combination. Automated processes typically include individual control of appliances via a home automated network (HAN), from which residential consumption can be shifted automatically to off-peak hours. The inclusion of some type of energy storage, such as a battery, can be integrated into a DSM scheme in a way that provides opportunity for both arbitrage based on differences in peak and off-peak rates and reductions to peak demand charges. In typical optimization schemes, the battery stores excess capacity from renewable sources like solar and wind but this is not typically integrated into an overall optimization calculus based on predictive factors.

Optimization of electricity supply and demand for a building or network of buildings, inclusive of renewable energy sources and storage, can be improved significantly beyond prior approaches by integrating three predictable factors: (1) the wholesale market price of electricity; (2) the availability of renewable energy; and (3) the building's consumption. Each of these factors can be predicted with significant accuracy for the next 24 hours. Regional transmission organizations (RTOs) publish predicted wholesale hourly prices, also known as "day ahead" rates, in advance of the market day.

Weather predictions can provide data related to ambient hourly temperature, which is a significant factor in a building's consumption, as well as the hourly availability of solar radiation or wind. A building's hourly electric consumption can be predicted with significant accuracy based on historical factors, weather (e.g., combined heat and humidity), and both demographic and physical considerations that form a "load profile" (e.g., square footage, weekday/weekend/holiday, home office use). With these factors included in the optimization calculus, a building that incorporates renewable energy, grid power and storage can engage in electricity arbitrage and peak power reductions. Power can be acquired and stored when it is cheap, free or even at time when the utility will pay the building owner to take power off the grid. The stored power can then be used later when the real-time price of electricity is high.

This network of distributed generation and storage can be scaled into a virtual power plant to provide even greater economic benefits, as the resulting network becomes an immediate source of reliable power for ancillary services and peak power. Generally, ancillary services provide greater economic benefit than arbitrage, with frequency regulation providing the highest value. The owner of electricity storage must be available to reduce load (or in same cases, increase it) in a matter of seconds and must have a reliable supply (or sink) of power to do so. The invention can determine the allocation of networked storage and control it at the individual building level, based upon the need and value of services storage can provide (frequency regulation, spinning reserve, peak power and arbitrage) and thus maximize economic value for both individual building owners, groupings of building owners (e.g., a commercial campus or tract-home development) and the network as a whole.

An additional benefit of the invention is that it adheres to the "one way" structure of the electricity delivery system. Generally, the grid has been designed for a process in which electricity is generated by large power plants (whether nuclear, fossil fuel-based or wind), and then transmitted over large "arteries," from which point it is distributed at multiple points and consumed locally. The system was not well-designed to accommodate the reverse—power generated at thousands of points of consumption and placed back on the transmission grid—even though this is what "net metering" schemes require and "smart grid" promises. A simpler, better way to accomplish utilities' objectives of access to immediate, reliable power than placing it back on the grid is to avoid pulling it off. The present invention teaches such a method, which has the added advantage of keeping all activity on the customer side of meter. This attribute protects the building owner from being subject to regulatory approval.

DISCUSSION OF THE PRIOR ART

The prior art generally discloses the following: (1) energy management and optimization methods, which may include both energy storage and renewable energy sources: (2) network models for storage, arbitrage and distribution of electricity, including that used for ancillary services; (3) methods for demand side management and load shifting; and (4) incorporation of predictive algorithms into (1), (2) and (3).

For example, application US Pat. Pub. No. 2009/031090 discloses an energy optimization system that incorporates grid electricity, renewable electricity and storage. The '090 application claims optimization based upon forecasted load and energy cost but does not claim inclusion of forecasted renewable energy production in its optimization system, nor does it claim optimization in accordance with a value hierarchy, i.e, for a variety of wholesale power applications for stored or renewable energy at a given time. The '090 application does not disclose a multi-stage optimization method for storage and discharge, i.e., a first stage for optimizing charging a battery to maximize arbitrage benefits, a second stage for revising optimization constraints in accordance with a value chain that provides both individual building and aggregation benefits with higher value than arbitrage, a third stage for optimizing discharge to maximize arbitrage benefits and a fourth stage to revise constraints to provide power for higher value applications than arbitrage. The '090 application makes no reference nor does it claim balancing the system's cost objectives with maximizing the useful life of the battery. The disclosed system does not reference scalability nor does it teach how to "right size" the amount of renewable energy and battery capacity for the building load in a way that will maximize return on investment.

Similarly, U.S. Pat. No. 7,274,975 discloses an optimization system for a grid-connected building that includes renewable energy sources like solar and a battery. In particular, the '975 patent references the simplex algorithm as one possible optimization method for matching energy supply to current and forecasted loads. The '975 patent does not optimize based upon an objective function consisting of current and predicted electricity rates; instead, it shifts load to lower cost times. The '975 also does not disclose the aggregated use of stored power in accordance with a value hierarchy.

U.S. Pat. No. 6,925,361 discloses a charge/discharge controller that directs electricity flow among the grid, renewable energy sources and a battery. The '361 patent discloses use of linear programming optimization algorithms and the use of neural networks to determine constraints. It does not discuss a predictive profile, as control decisions are based upon current operating conditions and their conformance to stored patterns or profiles. The '361 application does not claim or disclose a value hierarchy analysis nor does it discuss the notion of a virtual power plant.

The present invention synthesizes elements from various prior art disclosed herein and adds new elements to create a novel system and method that improves on the prior art significantly. These improvements include:

- A multi-stage system and method based on a value hierarchy for optimizing both (1) charging and (2) discharging the battery, taking into account intraday optimization opportunities, balancing cost savings objectives with maximizing the battery's useful life, aggregation possibilities and the unique single-variable and aggregate constraints of multiple optimization stages.
- Scalability of the system and method for network application, in which both common and individual building assets are incorporated and allocation of benefits can occur based on different criteria.
- Static or dynamic allocation of energy storage based on different values for different applications, e.g., frequency regulation vs. arbitrage.
- Incorporation of static loads like PHEV "refueling" with dynamic loads (the building's consumption) into the optimization calculus.
- Determining the optimal amount of battery and solar PV capacity to install for a building, given the rate structure, model availability of PV and load profile of the building.

SUMMARY

The present disclosure is a scalable method and system for efficiently distributing power and increasing the cost savings and improving the overall economics that can be achieved when renewable energy is incorporated with energy storage into grid-tied buildings, subdivided units within these buildings or multiple buildings/units within a development. The customized power distribution and increased cost savings for each building or unit results from taking advantage of (a) the market value of renewable energy vis-á-vis its "flat rate" value; (b) arbitrage based on a multi-stage optimization method using predictive algorithms; (c) reduction or elimination of the capacity charge inherent in real-time pricing schemes; and (d) provision of frequency regulation and other ancillary service capacity to the wholesale power markets.

The disclosed system advantageously distributes power by networking data from individual systems (renewable energy and storage) together, resulting in a virtual power plant. This aggregation of renewable generation capacity and stored power allows centralized control that can respond to pricing signals and accommodate wholesale market requirements (e.g., regulation, spinning reserve, peak power) within a value hierarchy on a nearly immediate basis. Inherent in the improved economics and cost savings is access to backup power.

Individual power distribution and cost savings occur in time-of-use and real-time pricing environments because solar electricity output occurs during daylight hours when the market price of electricity is generally higher than the flat rate. This alone does not generally compel a building owner with renewable energy to switch from a flat-rate plan to a time-of-use or real-time pricing plan even though the last two are typically less expensive. Because individual customers have no control over wholesale electricity prices, the volatility of this market coupled with high peak demand rates generally make the guaranteed flat rate plan a safer option even though it is more expensive. In the present invention, incorporating renewable energy, a battery and a smart controller ameliorates this volatility and augments the inherent savings of both flat rate and real-time pricing plans with (a) arbitrage and (b) elimination of the capacity charge. In fact, aggregation at the wholesale level will produce benefits that can accrue to flat rate plan customers, as the flat rate inherently contains both energy/arbitrage and capacity charge components. Savings from flat rate aggregation will not show up as a reduction on flat rate customers' bills but could be rebated to rebated to them after proceeds of this benefit are recovered from the wholesale power market.

In one variation, arbitrage is accomplished in a multi-stage optimization process that employs dynamic "smart" individual and aggregate constraints in each stage. Constraints employed in each optimization stage factor in predicted values and relationships among market electricity rates, availability of renewable energy sources, building load, battery characteristics and lifecycle, and other factors. In the first stage, predictive algorithms calculate the lowest cost times to acquire electricity from various sources (e.g., electric grid, solar panels, wind), determine how much electricity to acquire from each source, and effects storage of this electricity in the battery. These constraints are then altered and augmented as necessary to reflect a value hierarchy, in which arbitrage is generally the lowest-value component, and demand/capacity charge reductions and frequency regulation are higher-value components. In a later stage, computer algorithms limited by dynamic constraints calculate and predict the optimal (i.e., highest value) times to use electricity stored from the battery to supply building load or sell back to the grid. These calculations are updated each time the real-time rate for electricity changes.

To recover part of the inherent cost difference between real-time rate and flat rate pricing plans, utilities assess a demand or capacity charge, which is essentially a penalty for using electricity during the highest demand hours of the month or year. Utilities typically calculate this charge in one of two ways: (1) the customer's consumption during the highest 5-10 demand hours of the year, compared to a baseline, or (2) the highest interval (15 minute, 30 minute, or one hour) power usage (measured in kilowatts) during each billing cycle. In one variation, elimination of the demand/capacity charge is accomplished by switching electricity supply from the grid to battery during the peak demand hours. This instruction supersedes any arbitrage-based instructions, e.g., if arbitrage results dictate that the battery remain idle during a particular interval, but the building load will create a "superpeak" interval for demand/capacity charge determination, then the command to switch from grid to battery power during this superpeak hour will override the arbitrage command.

The computer-based algorithms used to optimize a customer's cost savings can also be employed to calculate the optimal amount of renewable energy and storage capacity that should be installed within a building or network of buildings to achieve these savings. In one variation, these algorithms can be run for different configurations of solar and battery capacity using model and/or actual data for load, PV production and real-time rates. Regression analysis based on these results can be employed to maximize ROI for a given capital cost per installed solar kilowatt and battery kilowatt-hour.

Cost savings from (a) real-time value of solar production, (b) arbitrage and (c) reduction/elimination of the capacity charge will typically be realized in the form of a lower electricity bill for the customer. The creation of a "virtual power plant" through aggregation of renewable generation capacity and stored power creates economic benefit for the aggregator by creating the ability to accommodate high value needs like ancillary services and peak power for the wholesale power market which generally operates at a regional level. The U.S. electricity grid is actually a complex collection of connected regional grids. Management of these grids is the responsibility of organizations known as regional transmission organizations ("RTOs") or independent system operators ("ISOs"). ISOs/RTOs are responsible for regulating transmission voltage, ensuring adequate reserve known as "spinning reserve" and managing congestion. Because of the need to maintain near-constant voltage/frequency and adequate reserves, ISOs/RTOs pay a premium for immediate access to reliable power or, in some cases, load.

In one variation, networked batteries provide a significant distributed store of power that can be accessed within seconds. For example, if transmission voltage is trending too low, the ISO/RTO would send a signal to the aggregator to help raise the voltage by putting more power on the grid. The network accomplishes this not by sending electricity from the batteries to the grid, but by shifting building load from the grid to batteries. The net effect is the same. The ISO/RTO pays the aggregator a negotiated rate per kilowatt-hour, comparable to insurance.

The ability to aggregate stored power has additional benefits during peak demand periods. Although building owners realize an individual benefit by using battery or solar power instead of the grid during peak price periods, utilities are willing to pay a premium beyond the market price to companies that can aggregate and control peak demand reductions. The additional value of the peak power incentive is generally based on multiplying the number of "super" peak kilowatt-hours avoided by an incentive rate. This results in initial revenues to the aggregator and is on top of the arbitrage cost savings realized by the building owner as reflected in the monthly electricity bill.

In a variation that incorporates multiple single buildings or units within a network (the "virtual power plant"), arbitrage is at the bottom of the value chain. Arbitrage instructions are interrupted by either aggregated peak power demand signals from the utility or ancillary services demand signals from the RTO. At the top of the value chain is backup power; if there is an outage, then any stored power will become available to address building load. As suggested earlier, the benefits are additive, i.e., the building owner and virtual power plant would realize multiple benefits by switching from grid to battery power during a "superpeak" hour used in calculating the demand/capacity charge baseline, stemming from (a) arbitrage, (b) aggregated demand side management and (c) avoidance of the demand/capacity charge. The predictive aspects and value hierarchy can be augmented by incorporating static elements such as plug-in hybrid vehicles ("PHEV"). For example, if the price of gasoline is high (relative to electricity) and the PHEV requires charging during the evening hours, then the value analysis will prioritize charging the PHEV battery before the building's stationary battery. Alternatively, if gasoline is relatively inexpensive and hourly electricity rates are predicted to be high, or if the likelihood of ancillary services is high, then charging the stationary battery would have a higher priority than charging the PHEV.

The capability of the invention to provide both individual cost savings to the building owner and revenues to the aggregator is based upon bifurcation of the storage device between benefits realized by the building owner (backup power, demand/capacity charge reduction, arbitrage) and network benefits (ancillary services, aggregated peak power). Bifurcation of the storage device can be either physical, virtual or both. In one variation, physical bifurcation might involve different types of battery chemistries, e.g., lithium-ion for network requirements (ancillary services, aggregated peak power) and advanced lead-acid for individual requirements (backup power, demand/capacity charge reduction, arbitrage). Virtual bifurcation would involve one type of storage with dynamic allocation between network and individual benefits based on market, weather and historical factors. A combination between physical and virtual allocation would allow network and individual requirements to cross over two different chemistries, i.e., electricity stored in the lithium-ion battery and otherwise reserved for ancillary services could be tapped into for arbitrage if warranted by market conditions.

The scalability of the invention from a single unit providing electricity savings to the building owner to the aggregated "virtual power plant" participating in the wholesale electricity market produces a number of intermediate-level variations. In one variation, a multi-unit building or development employs a combination of common and individual assets (solar panels, wind turbines and storage). Each unit as well as common areas employ an individual control device, and data from each device is aggregated at the community level. The algorithm performs hourly optimization calculations for the individual units, common areas and the community. The system allocates the economic benefits of the common area/community-level assets to the individual units on the basis of selected factors, e.g., lower baseline consumption, lower peak consumption and individual renewable energy generation. The community-level device can be set to manage and control both community-level and individual level stored power for both individual benefit (e.g., arbitrage) and overall benefit (e.g., ancillary services).

The invention is not intended to be limited in any way by this brief summary of certain variations. Other variations and embodiments are described in more detail below.

BRIEF DESCRIPTION OF THE DRAWINGS

The detailed description particularly refers to the accompanying figures in which:

FIG. 3 is a schematic illustration of one structure of a first stage of the optimization algorithm directed to charging for arbitrage;

FIG. 4 is a schematic illustration of one structure of a second stage of the optimization method directed to charging charge constraints in accordance with a value hierarchy;

FIG. 5 is a schematic illustration of one solution for the second stage of the optimization method directed to revising e charge constraints in accordance with the value hierarchy for a first hour;

FIG. 7 is a schematic illustration of one solution for the fourth stage of the optimization method directed to revising discharge constraints in accordance with the value hierarchy for a first hour;

DETAILED DESCRIPTION

Figure 1:
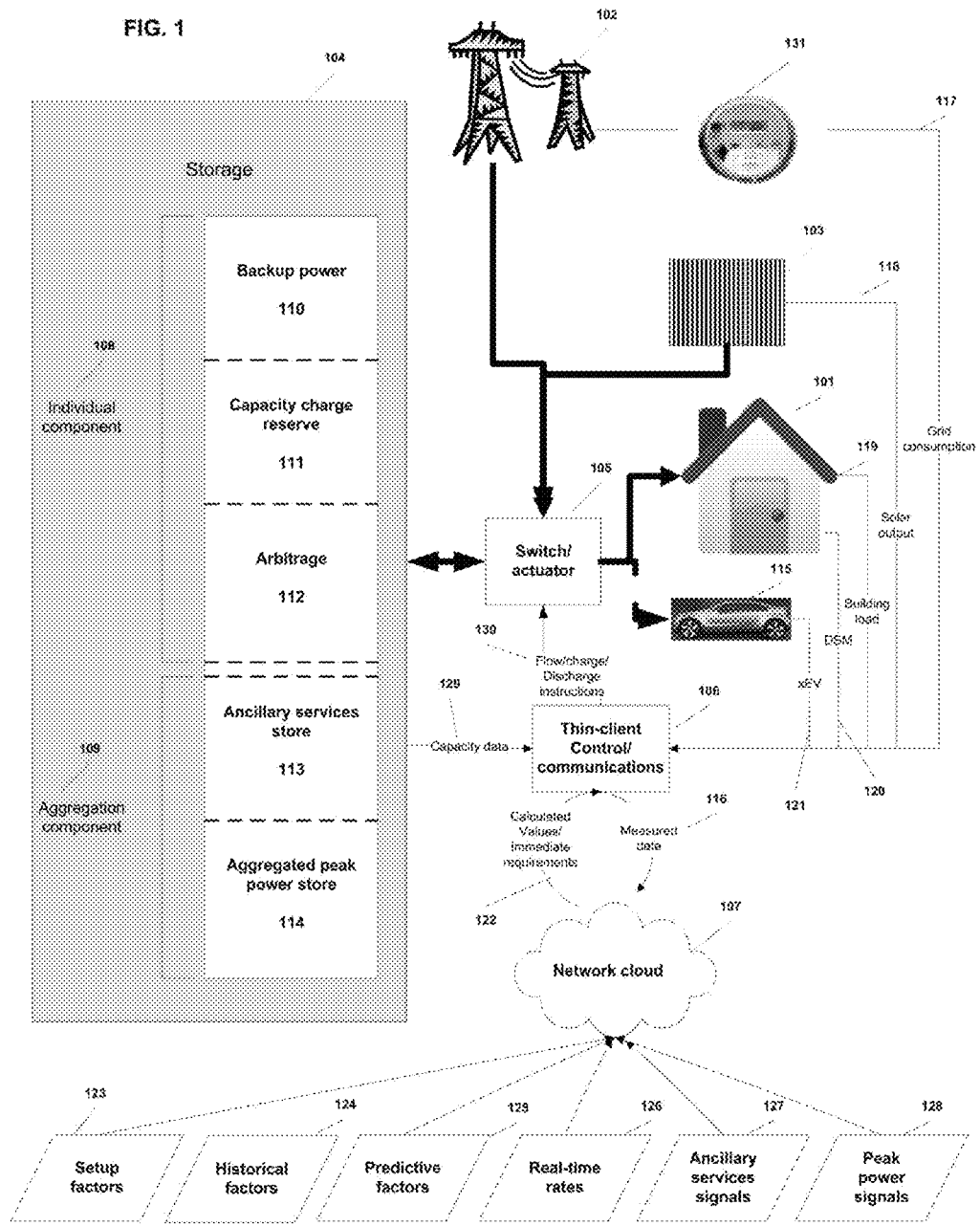
FIG. 1 is a schematic of the building block for an exemplary virtual power plant for an individual building.

While the present disclosure may be susceptible to embodiment in different forms, there are shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Buildings incorporating renewable energy sources like solar and energy storage devices like batteries have four common characteristics. First, they all have demand for electricity, otherwise known as load. Second, their renewable energy sources have the capability to generate some or all of the electricity needed to meet current load requirements if the renewable source is present (e.g., solar power). Third, the storage device has the capability of acquiring electricity when it is free (e.g., when the solar panels produce power in excess of current load) or relatively inexpensive (when real-time electricity prices are low or even negative), and store it for later use when the energy is more valuable. Fourth, information technology can aggregate the collective production and storage capability into a network that forms the equivalent of a virtual power plant. As will be discussed below, this ability to aggregate creates significant value and opportunity within the power grid in the form of ancillary services, arbitrage and peak power supply.

FIG. 1 shows the basic building block of the virtual power plant under an exemplary embodiment. Building 101 has multiple sources to satisfy its electricity load: the grid 102, a local renewable energy generation source 103 and a storage device 104, which may include a plurality of storage devices. The flow of electricity from the supply sources—grid, renewable energy and storage device—to the demand sources—building load 101 and storage device 104—is governed by a switch/actuator 105. Inversion/rectification of current between DC and AC occurs as necessary but is not shown for the purpose of brevity. The switch/actuator 105 controls electricity flow paths and limitations upon them from instructions it receives from the thin-client control/communications device, also known as the gateway 106. In the preferred embodiment, electricity is not routed or "net metered" back to the grid, although it can be in different variations.

The instructions for electricity flow control and limitations, e.g., how much electricity should be purchased from the grid at a given time and stored in the storage device, and when and how much should be discharged—transmitted from the gateway (thin-client control/communications device) 106 are calculated within the network cloud 107 and communicated to the gateway. In the preferred embodiment, computations in the network cloud allocate storage space in the storage device 104 based upon a dynamic value hierarchy. This hierarchy is bifurcated between individual building components 108 and aggregation components 109. Allocations are made to satisfy individual building needs, including backup power 110, reserve for demand/capacity charge assessment periods 111 and arbitrage 112. Demand/capacity charge assessment periods generally occur in one of two ways: (1) during the 5-10 highest demand hours of the year, resulting in the utility charging a monthly penalty to building owners who consume more than a baseline amount of electricity during those periods; and (2) during the highest periodic interval (15, 30 or 60 minutes) within the billing period (generally 30 days). Arbitrage provides the capability to acquire electricity when it is (a) inexpensive, (b) free (e.g., from solar production that exceeds the building load) or (c) negatively priced, and store the acquired electricity for use in satisfying building loads during hours when the real-time rate for electricity is relatively high. Depending on the type of rate plan adopted by the customer, arbitrage benefits can be realized either at the retail level, viz., as a reduction to the customer's bill, or at the wholesale level as the result of aggregation.

Aggregation components 109—electricity supply sources that satisfy bulk power requirements of utilities and regional transmission organizations (RTOs)—include ancillary services (frequency regulation) 113 and aggregated peak power 114. They can also include energy arbitrage based on differences in real-time prices (not shown here). Ancillary services (frequency regulation) pertain to the intermittent but immediate needs of RTOs to tap into reliable power (or load) to maintain transmission quality, e.g., keeping transmission voltage within a specified tolerance. Examples include regulation up (raising transmission voltage by putting power back on the grid or reducing load), regulation down (lowering transmission voltage by pulling power off the grid) and spinning reserve (maintaining a supply of electricity above current demand to address sudden spikes in demand or losses in generation capacity). Aggregated peak power provides electricity (or reduces load) to utilities during peak demand periods, thus avoiding the need to bring pure peaker power plants on line. In the preferred embodiment, stored electricity is not put back on the grid from distributed sites to satisfy these requirements; instead, load is shifted from the grid to the battery among a plurality of users.

In addition to the storage device 104, in which allocation of stored electricity for various purposes occurs dynamically, a static stored electricity amount, such as a pure electric vehicle (PEV) or plug-in hybrid vehicle (PHEV) (collectively, xEV) 115 can also be accommodated in the value hierarchy. For example, if the price of gasoline is relatively high when compared to the price of electricity, then instructions from the thin-client device 106, as determined in the cloud 107, can prioritize charging the xEV's battery before charging the storage device. Alternatively, if the price of gasoline is relatively low when compared to various components of the stored energy value hierarchy, then the cloud 107 would determine that the storage device 104 should be charged before the xEV 115 to the extent that the value hierarchy warrants. In one embodiment, backup power has the highest value rating among hierarchy elements during high-risk periods of power blackouts, e.g., a pending severe thunderstorm. If the storage device can provide a maximum of 5 kilowatt-hours of stored energy, and the user has determined that a minimum of two kilowatt-hours of stored power should be reserved for backup power during such periods, then the cloud would determine that the storage device should be charged first up to 2 kWh of stored power. If the xEV is the second highest value in the hierarchy, then the system would be directed to charge the xEV before charging the rest of the battery.

In making its calculations, the cloud 107 employs optimization methods using both predicted values and measured values, within dynamically calculated constraints. Measured values 116 include metered consumption from the grid 117 (typically cumulative by hour or subintervals within an hour), PV output from the solar panels 118 (same), total load of the building 119 and storage capacity 129. If the building participates in demand-side management (DSM) programs, in which load is automatically curtailed or shifted during peak demand periods, then this set of instructions 120 from the building is also incorporated. The current state of charge of the xEV's battery 121, if applicable, is also incorporated. Measured data also include efficiencies of the components, e.g., inverter, solar panels and storage charge/discharge (not shown). These data are 116 transmitted to the network cloud 107.

The cloud's 107 computations incorporate the measured data and other factors from the building with setup preferences 123, historical data 124, predicted values 125, real-time rates from the utility 126, ancillary services requests from the RTO 127 and peak power/demand response requests from the utility 128. The results of these calculations are a series of instructions and override commands 122 transmitted to the thin-client device/gateway 106. These instructions and override commands create a set of digital signals 130 transmitted to the switch/actuator (generally contained within a battery-based inverter) 105 that control the flow of electricity among the grid, solar panels, storage device and building load, as well as charging, idling and discharging the storage device. In this exemplary embodiment, electricity, from the grid is measured by the utility meter 131; all other flows of electricity within the system occurs "behind the meter."

Figure 2:
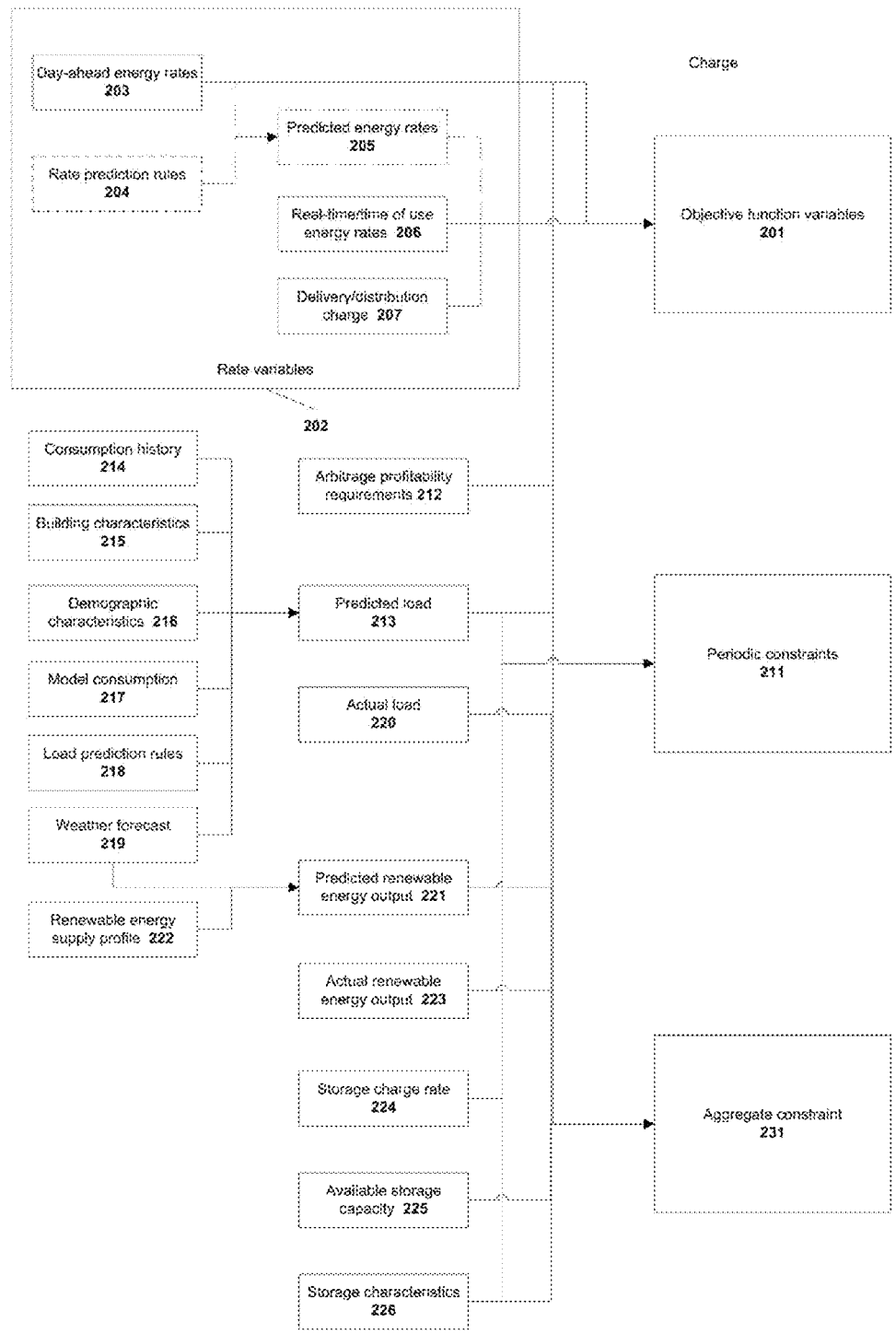
FIG. 2 is a diagram of sources of data for an exemplary optimization method.

The method employed in the cloud's 107 computations is a multi-stage optimization process where independent variables for the arbitrage component of the value hierarchy are the periodic real-time and predicted/day-ahead rates for electricity (usually published hourly but sometimes more frequently). The stages are a series of calculations optimizing when and how much to charge and discharge the battery based upon predictive algorithms and dynamically determined constraints. As arbitrage is typically the lowest value component in the value hierarchy, the first stage is to set up the optimization calculus to maximize its value, which consists of variables, periodic constraints and an aggregate constraint, and begins by determining how to acquire and store power at the lowest cost. FIG. 2 shows how various data factor into the first stage optimization set-up (charging the storage device). The variables in the objective function 201 consist of rate variables 202 derived from a combination of actual and predicted values. In the preferred embodiment, optimization occurs at the beginning of each hour as soon as the real-time rate for that hour is published. A first step of the hourly optimization process is to minimize the objective function $$a_1 x_1 + a_2 x_2 + a_3 x_3 + \ldots + a_{24} x_{24}$$

where $a_1$ is the actual hourly market rate 206 for the first hour, and $a_2 \ldots a_{24}$ are the day ahead hourly rates 203 for the next 23 hours. In one variation of the preferred embodiment, the predictive quality of the day-ahead rates (which typically approximate but rarely duplicate hourly market rates) can be improved by factoring in rate prediction rules 204, thus deriving predicted market rates 205 that more closely approximate real-time market rates 206. In another variation, the market rate variable for each hour equals the sum of the rate (real time rate for the first hour, predicted/day ahead rates for subsequent hours) plus the static transmission and distribution, or "line" charge 207.

The optimization model, which in the preferred embodiment employs linear programming techniques, requires a constraint for each period 211 (hourly in the preferred embodiment) and an aggregate constraint for all remaining hours 231. As discussed below, additional aggregate constraints for a subset of hours/periods can be implemented later as the value chain warrants. Constraints are determined every hour once the hourly market rate is published; more frequent determinations are also possible for real-time price changes occurring more frequently than once each hour. Dynamic determination of the constraints is possible because of the ability to make reasonably accurate hourly predictions of market rates, ambient temperature and humidity, building load and solar PV availability for the next 24 hours. As an example, the "spread" between the lowest and highest real-time rates for a 24-hour period can be estimated once the day ahead rates are published (usually around 4 p.m. the previous day). If the storage device is a battery, it does not make sense to charge it and discharge it for arbitrage purposes unless the spread in rates (coupled with the charge/discharge and inversion/rectification inefficiencies) will result in a material profit. These profitability requirements 212 limit the aggregate constraint 231; electricity will not be purchased from the grid and stored for later use unless the avoided hourly market rate is materially higher than the market rate at the time of purchase.

Predicted periodic (in the preferred embodiment, hourly) load 213 is based on a number of factors: the building's consumption history 214, its characteristics (e.g., square footage, gas vs. electric heat, home office use, occupancy) 215, a consumption model for the particular type of building 216, load prediction rules (e.g., weekday vs. weekend, comfort zones in which HVAC is not used) 217 and the weather forecast for the next 24 hours, 218, which provides predictions of hourly ambient temperature and humidity (the major factor in HVAC use) and sunlight/cloudiness (which affects lighting use). These factors are meant to be exemplary only, and other/different factors may be incorporated into load predictions. As actual load 220 is measured and reported to the cloud each period (usually hourly), it is factored into the next series of load predictions once the next market rate for the period is published.

Predictions of hourly electricity generated from renewable energy sources 221 (solar PV in the preferred embodiment) are derived from multiple sources, such as a periodic weather forecast 219 (which predicts both PV intensity and cloudiness) and a profile of the renewable energy equipment 222 (e.g., solar installation characteristics such as efficiency and tilt). These factors are meant to be exemplary only and other/different factors may be incorporated into the renewable energy output predictions. As actual renewable energy output 223 is measured and reported to the cloud each period, it is factored into the next series of renewable energy output predictions once the next market rate for the period is published.

The final component of determining the periodic and aggregate constraints for charging the storage device relates to the characteristics and capacity of the device itself. These include the rate at which the device can be charged 224, the amount of available capacity for charging 225 (which takes into account the predicted excess solar PV that will be stored) and the characteristics of the device 226, e.g., the efficiencies of charging and rectification (converting alternating current from the grid to direct current for storage). These factors are meant to be exemplary only and other/different factors may be incorporated into the storage characteristics.

For arbitrage optimization, each periodic variable (hourly in the preferred embodiment) is constrained by the lesser of: (a) the charge rate of the battery (net of battery efficiency and rectification) minus the predicted amount of excess electricity (net) the solar panels will provide, or (b) the available unused capacity of the battery that hour. The hourly constraint cannot be less than zero. In other words, for each hourly calculation for the first hour:

$a_1$<=Minimum (net hourly charge rate—predicted excess capacity from PV in hour 1, available battery capacity)

$a_2$<=Minimum (net hourly charge rate—predicted excess capacity from PV in hour 2, available battery capacity), repeating for each hour through $a_{24}$<=Minimum (net hourly charge rate—predicted excess capacity from PV in hour 24, available battery capacity).

In determining the aggregate constraint for charging during the first hour, the exemplary method determines how much electricity can be stored and used later at a profit, taking into account hourly price differentials and the physical inefficiencies of charging/discharging the battery and inverting/rectifying electric current. The electricity to be stored comes from multiple sources, such as (1) the grid during hours with low market prices, and (2) electricity produced by the solar panels that exceeds the load requirements of the building. The system will store only as much electricity as the building can use profitably. For example, on a temperate day in spring or fall, in which total daily demand is low, the system may determine that the battery should not be charged to full capacity. On high demand days in summer, when the entire amount of stored electricity could be consumed in one hour and solar alone cannot meet hourly capacity, the system will determine that the battery should be fully charged. Because hourly rates often have two peaks during the day—a morning peak during rush hour and a late afternoon/early evening peak—it is entirely possible that more than one charge/discharge cycle can occur in a day.

In the preferred embodiment, the aggregate constraint for all hours for the first hourly charge calculation to optimize arbitrage is:

$$a_1+a_2+a_3+\ldots+a_{24}>=\text{Minimum (Cumulative load for all hours in which electricity can be stored and used profitably, total daily consumption, current available capacity minus cumulative amount of excess capacity from }PV).$$

Figure 3:
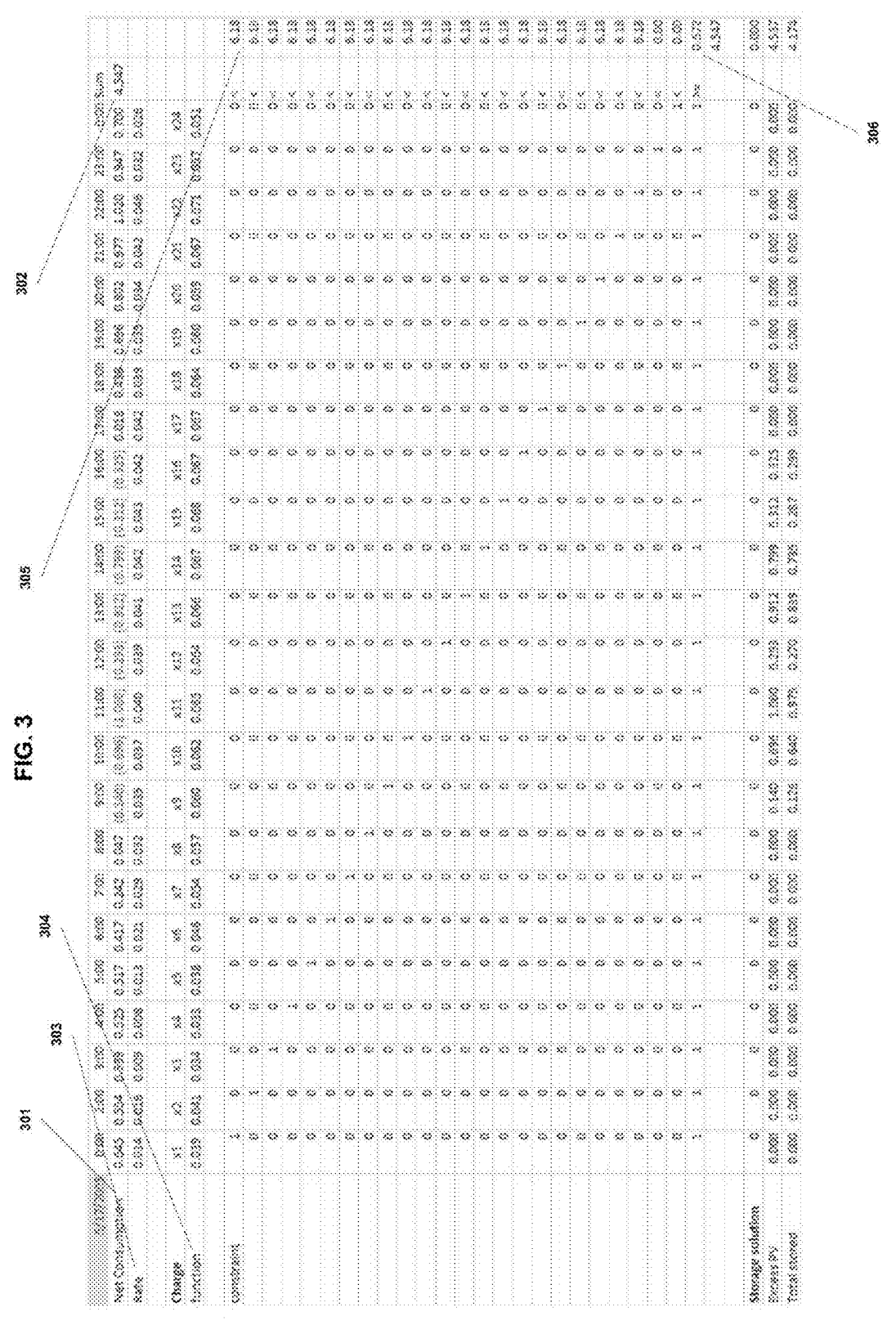

FIG. 3 illustrates one variation of how the charge optimization profile for arbitrage is set up for the first hour's calculations. The example of FIG. 3 is based on, a spring day in which solar PV output will exceed building load for a number of hours. Net consumption 301 for each hour is the predicted load of the building minus predicted generation of solar PV. For hours in which PV generation exceeds building load, this value is negative. The predicted total load for the 24 hour period 302 is the sum of the net hourly load. Rates 303 are the published real-time energy cost rate for hour 1 and the day ahead rate for hours 2-24. This value does not include the transmission/distribution charge of 2.5 cents per delivered kWh. An objective function comprising 24 variables 304 is the sum of each value from the rate line 303 plus the 2.5 cents per kWh delivery charge. The hourly constraints 305 pertain to each individual hourly variable. In this example, the battery charge rate is 8 kilowatts per hour, the storage efficiency is 92% and the rectification efficiency is 88%, which explains why the constraint for hour 1 is 6.18 kw/hour. Finally, the aggregate constraint 306 reflects the Maximum amount the battery should be charged using energy from the grid for the entire 24 hour period. Note that the value represented in this exemplary embodiment, 0.572, is significantly less than the predicted net total consumption of the building 302; this is because excess capacity from PV will provide most of the required charge for the battery. As we will see below, these calculations adjust each hour to reflect how much electricity is actually stored and used by the building.

At this point, requirements from the value hierarchy are imposed on the constraints; the concept is to begin with the best case scenario for the lowest value component (arbitrage) and then to allocate portions of the energy storage capacity for higher value purposes that satisfy requirements of both the building owner and networked virtual power plant (the aggregation component). In one variation, this value hierarchy (with "1" representing the highest value) would be:

| Rank | Individual building component | Aggregation component |
|---|---|---|
| 1 | Backup power (static amount) | |
| 2 | | Ancillary services (voltage regulation) |
| 3 | Capacity charge reduction | |
| 4 | | Aggregated peak power |
| 5 | Backup power (dynamic) | |
| 6 | Arbitrage | |
| Varies | Static loads (e.g., PHEV) | |

In many cases, these benefits will be additive. For example, the same bloc of power used from the storage device instead of the grid for a given hour may provide a benefit for ancillary services (which the RTO pays), aggregated peak power (which the utility pays), capacity charge reduction (which results in a lowering of the customer's electricity bill) and arbitrage (which also results in a reduction in the electricity bill). To the extent that using stored power provides additive benefits, this is reflected by compounding priorities in the value hierarchy and thus forcing the optimization algorithm to reserve power to satisfy these hourly needs.

Figure 4:
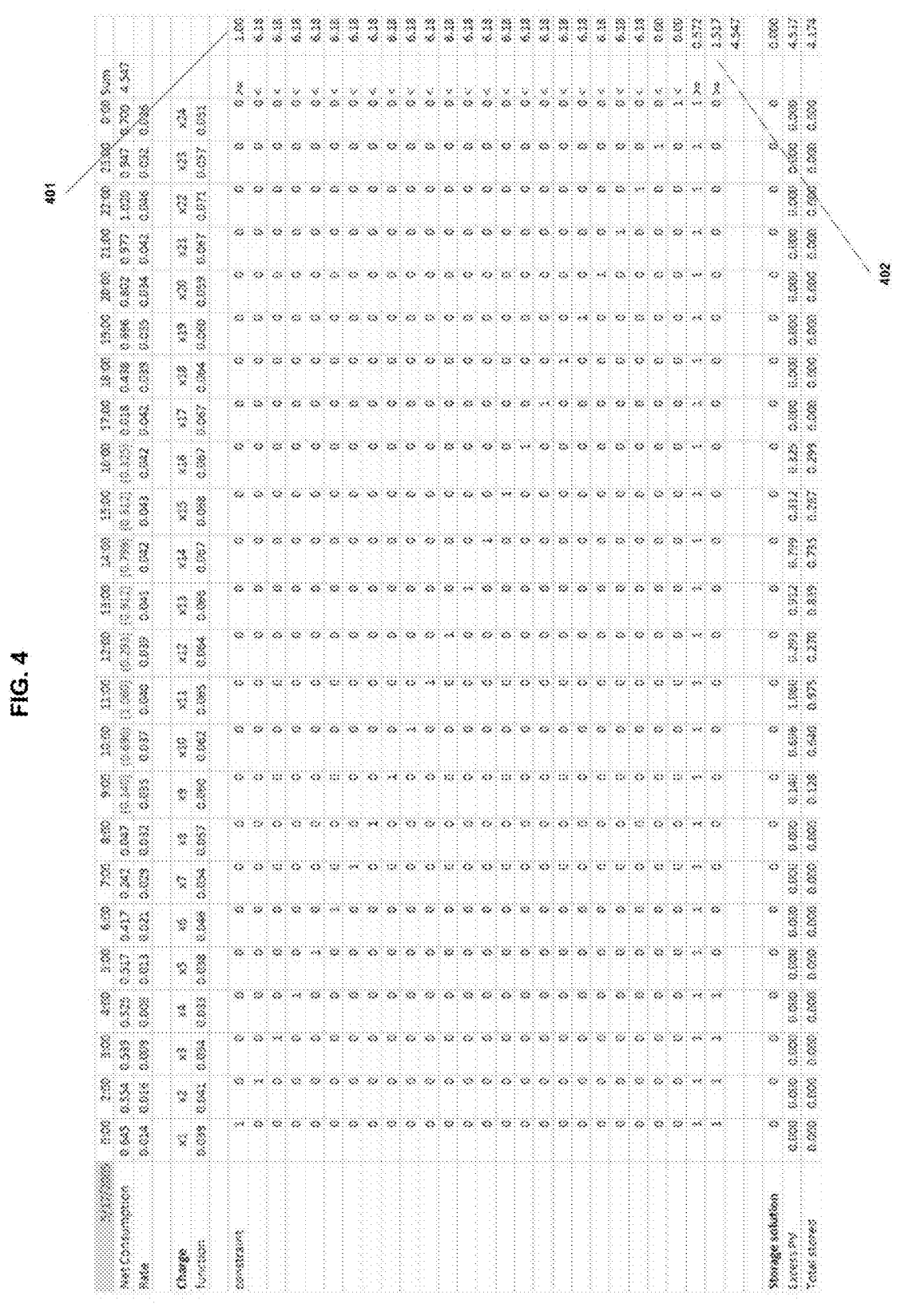
Figure 5:
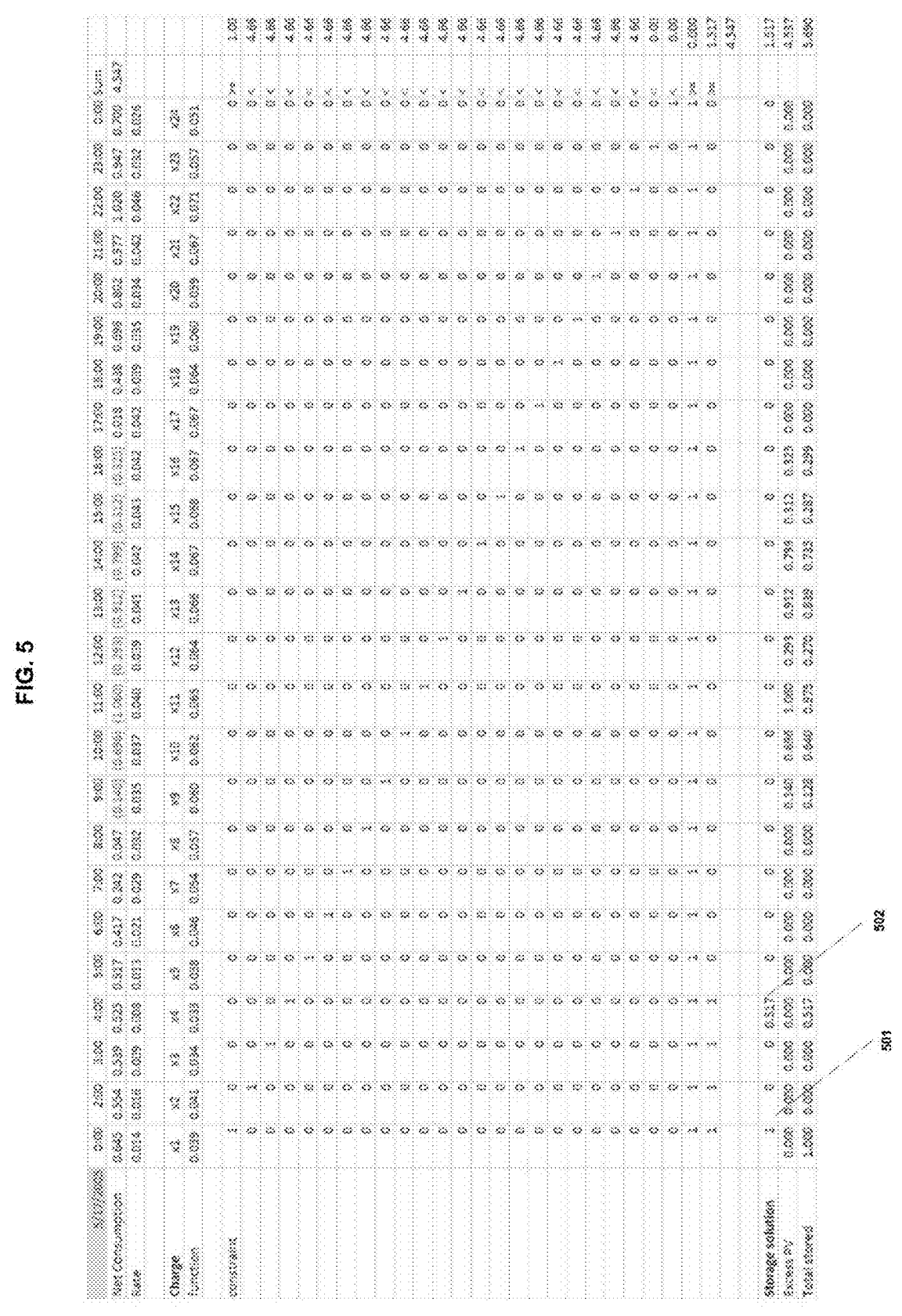

FIG. 4 provides an example of how this may work, based on the template set forth in FIG. 3. Assume the storage device is empty at 1 a.m., i.e., it has no available supply of stored electricity. The requirement of the building owner is that the storage device should always maintain at least one kilowatt-hour of stored electricity for backup power. Because this static backup power is the highest priority in the value chain, the hourly constraint for the first hour is changed to greater than or equal to 1.0. 401. Because this power is "reserved," it will decrement the aggregate constraint by 1.0 in future hours when the charge calculations are run. Next, assume that the RTO has signaled that it will need power from the network to regulate voltage at 5 a.m. The building's capability to provide its portion of these ancillary services is limited to the predicted load of the building, i.e., it can only switch from grid to battery power to the extent the building pulls power from the grid. To make sure this condition is satisfied, a second aggregate constraint is added to ensure that enough power has been stored (net of excess PV) to meet this demand in addition to the 1 kWh needed for static backup power—0.517 kWh 402. This constraint ensures that enough power is stored to meet the 5 a.m. ancillary services requirement in addition to the immediate need for backup power, and to achieve these two goals at the lowest cost (in addition to lowest overall cost for the next 24 hours). Based on these periodic and aggregate constraints, the optimization algorithm is run for the first hour as set forth in FIG. 5. The storage solution for the first hour is to acquire 1 kWh during the first hour 501 and the remainder of the power to satisfy the ancillary services requirement for 5 a.m. (0.517 kWh) 502.

Figure 6:
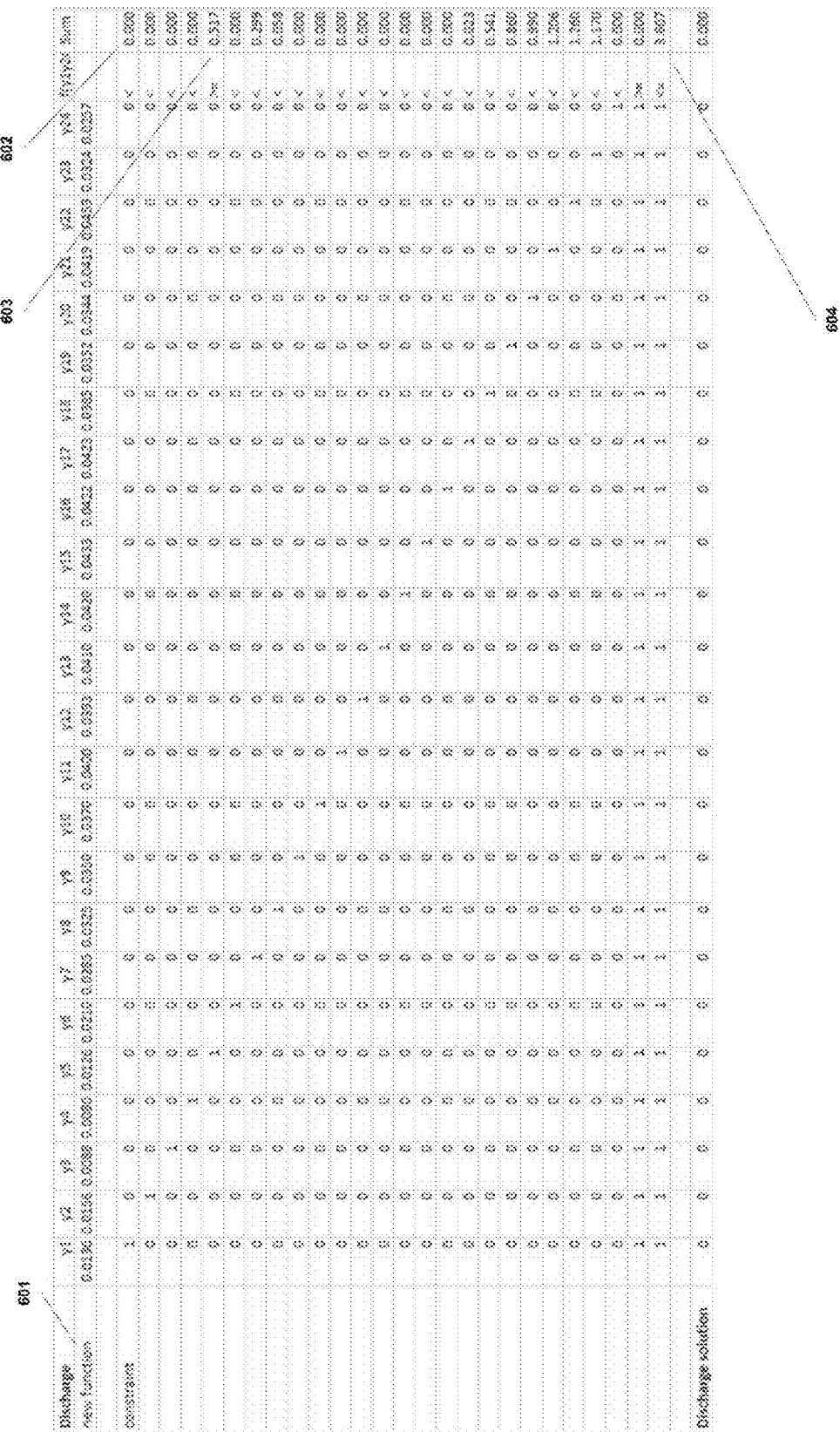
FIG. 6 is a schematic illustration of one structure of a fourth stage of the optimization method directed to revising discharge constraints in accordance with the value hierarchy.

Once a solution for the "charge" objective function is found for the first period (hour in the preferred embodiment), inclusive of the value chain, the system then maximizes the "discharge" objective function as set forth in FIG. 6:

$$b_1y_1+b_2y_2+b_3y_3+\ldots+b_{24}y_{24}$$

where $b_1$ is the actual hourly market rate for the first hour, and $b_2 \ldots b_{24}$ are the predicted (day ahead) hourly rates for the remaining 23 hours 601. In another variation, $a_1$ equals the sum of the hourly market rate plus the static transmission and distribution, or "line" charge. In yet another variation, $b_1, b_2, \ldots b_{24}$ are equal to $a_1, a_2, \ldots a_{24}$—the hourly market rate for electricity, hourly, for 24 hours. In still another variation, $b_1, b_2, \ldots b_{24}$ are equal to the hourly market rate but $a_1, a_2, \ldots a_{24}$ are equal to the hourly market rate plus the static transmission and distribution charge. This is because the building owner must pay the utility to transport the electricity when charging the battery but does not have to pay the charge when stored electricity from the battery is used to power the building.

In the preferred embodiment, each hourly variable for arbitrage 602 is constrained by the following factors:
(a) The battery's maximum hourly discharge rate;
(b) The predicted hourly load of the building, net of power supplied by PV. If there is excess capacity from PV, then power supplied by the battery will be zero other than for interruptions due to cloud cover (subject to the discharge being "profitable"); and
(c) The total amount of available capacity in the storage (net of amounts reserved for static backup power, ancillary services, etc).

The battery cannot discharge in an hour in which it is charging, and the hourly discharge constraint for each hour cannot be less than zero. In other words, for each hourly calculation for arbitrage alone, $b_1, b_2, \ldots b_{24}$, <=Minimum (total available battery supply projected and available for that hour, building load net of predicted supplied PV for that hour, maximum hourly discharge rate of the battery). Following the example, 0.517 kWh have been reserved for discharge to satisfy the ancillary services requirement for hour 5 603.

Figure 7:
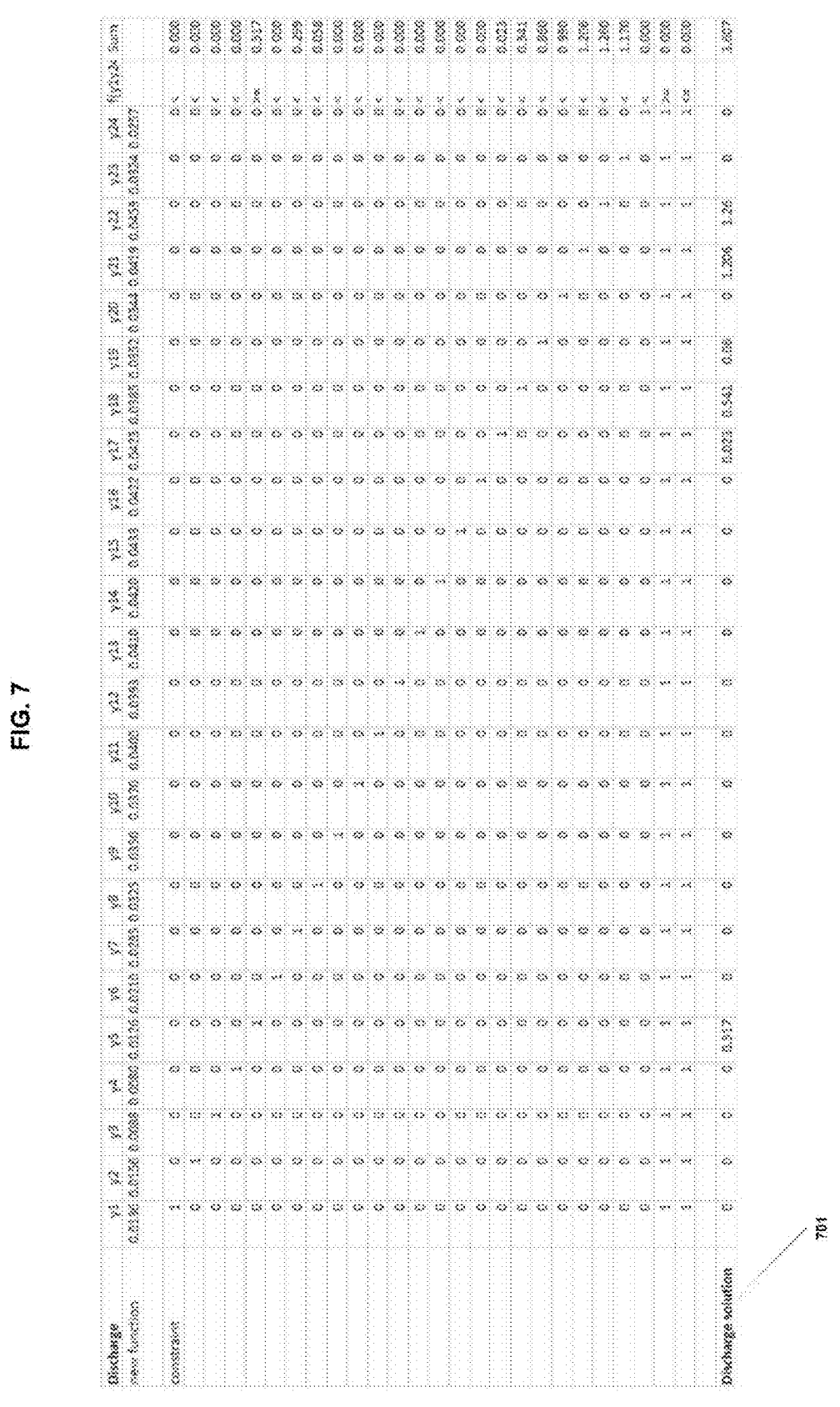

In the preferred embodiment, the aggregate constraint for all hours for the first hourly discharge calculation is: $b_1+b_2+b_3+\ldots+b_{24}$<=Minimum of (a) the net total amount of electricity expected to be stored during the 24 hour period (taking into account the charge/discharge and inversion/rectification inefficiencies), including excess PV that is stored, minus the amount of electricity discharged, and (b) the maximum storage capacity of the battery. As was true for the charge optimization, constraints in the discharge optimization are adjusted to account for higher-value added allocations of the stored electricity. For example, in the example from FIG. 5, the aggregate constraint 604 is decreased by one kWh to account for the stored electricity reserved for static backup power. FIG. 7 provides the results 701 of running the discharge algorithm once these constraints have been set.

Figure 8:
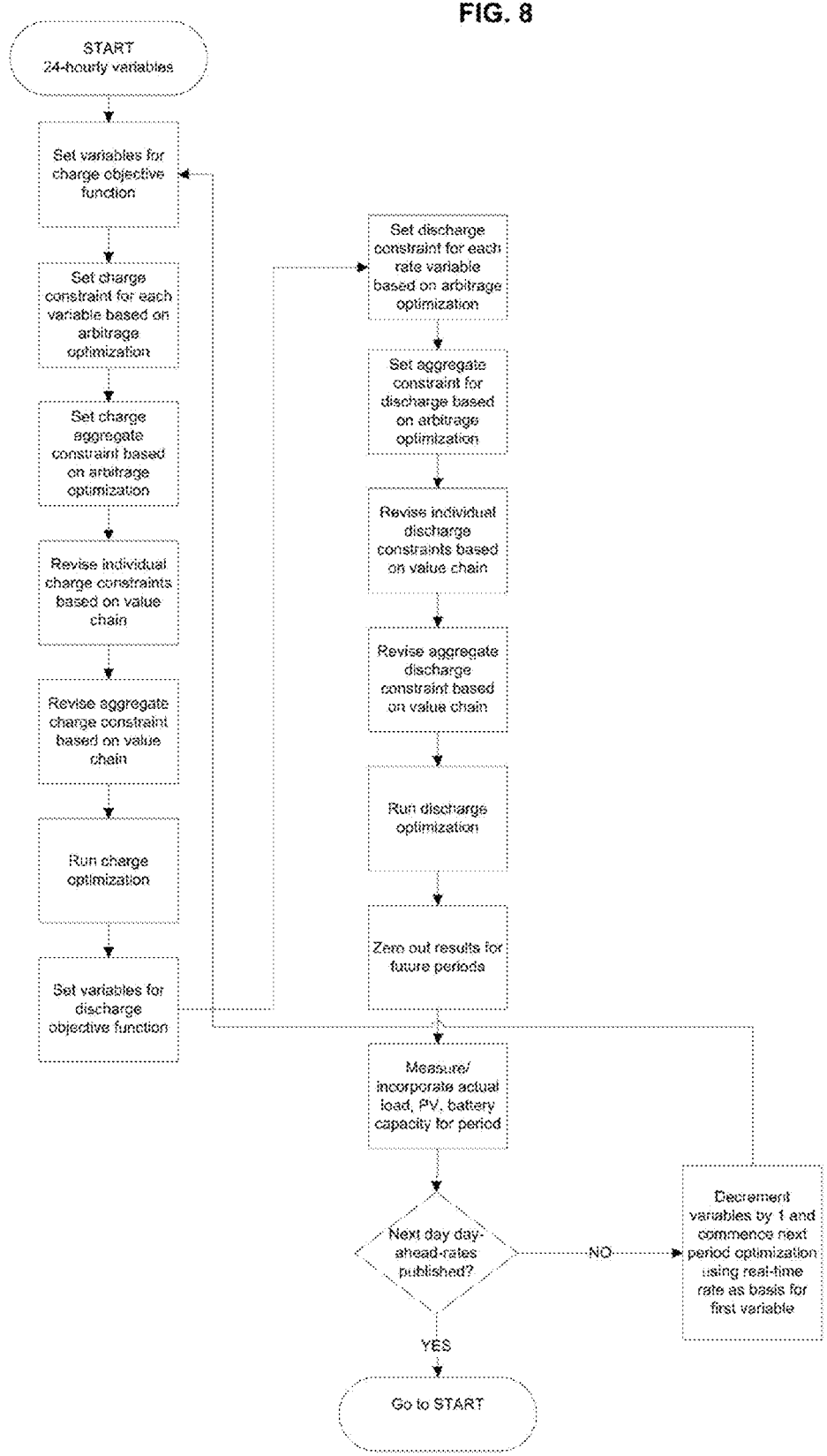
FIG. 8 is an exemplary process flow for multiple stages of the optimization method.

Based on the charge and discharge optimization calculations, the charge and discharge solution values for the current hour are kept and the values for the remaining hours are zeroed out. In other words, if the charge optimization calculation results in a positive value for charging the battery for the first hour, then the system is set to charge up to the calculated amount. If the discharge optimization calculation results in a positive value for discharging the battery during the first hour, then the system is set to supply load to the building from the battery up to the calculated amount. If both the charge and discharge amounts for the first hour are zero, then the battery is idle. In the preferred embodiment, the process repeats each hour with one fewer variable until next day's day ahead rates are published, at which point the 24 hour cycle resumes. FIG. 8 provides a process flow of how this works in the preferred embodiment.

In some situations (particularly RTO requirements for ancillary services like frequency regulation), the need for required high-value services cannot be predicted with certainty. In these situations, requests are immediate and take priority over other allocations resulting from value-chain optimization. One example would be a request for "voltage up" ancillary services because a surge in demand occurs at the same time a generation source goes offline. Within the value hierarchy, these types of immediate, interruptible requests can be accommodated in several ways. The first method is to use two or more storage devices, which may be of different types or employ different chemistries. In one variation, a lithium-ion battery representing 20% of total storage capacity would be dedicated to ancillary services and a lead-acid battery array representing 80% of total storage capacity would be used for all other needs of the value hierarchy. In another variation, a single type of storage technology would be employed, in which 20% of its total capacity would be dedicated for ancillary services with the remaining 80% of other needs. In a third variation, the entire storage capacity, net of an amount stored for backup power, would be dedicated to frequency regulation. For example, during periods in which the probability of arbitrage or demand/capacity charge reduction are low, (e.g, temperate days), the storage device would be dedicated for frequency regulation alone. These variations are meant to be exemplary only; a plurality of different storage devices, allocations and dedication profiles are also contemplated and possible.

Figure 9:
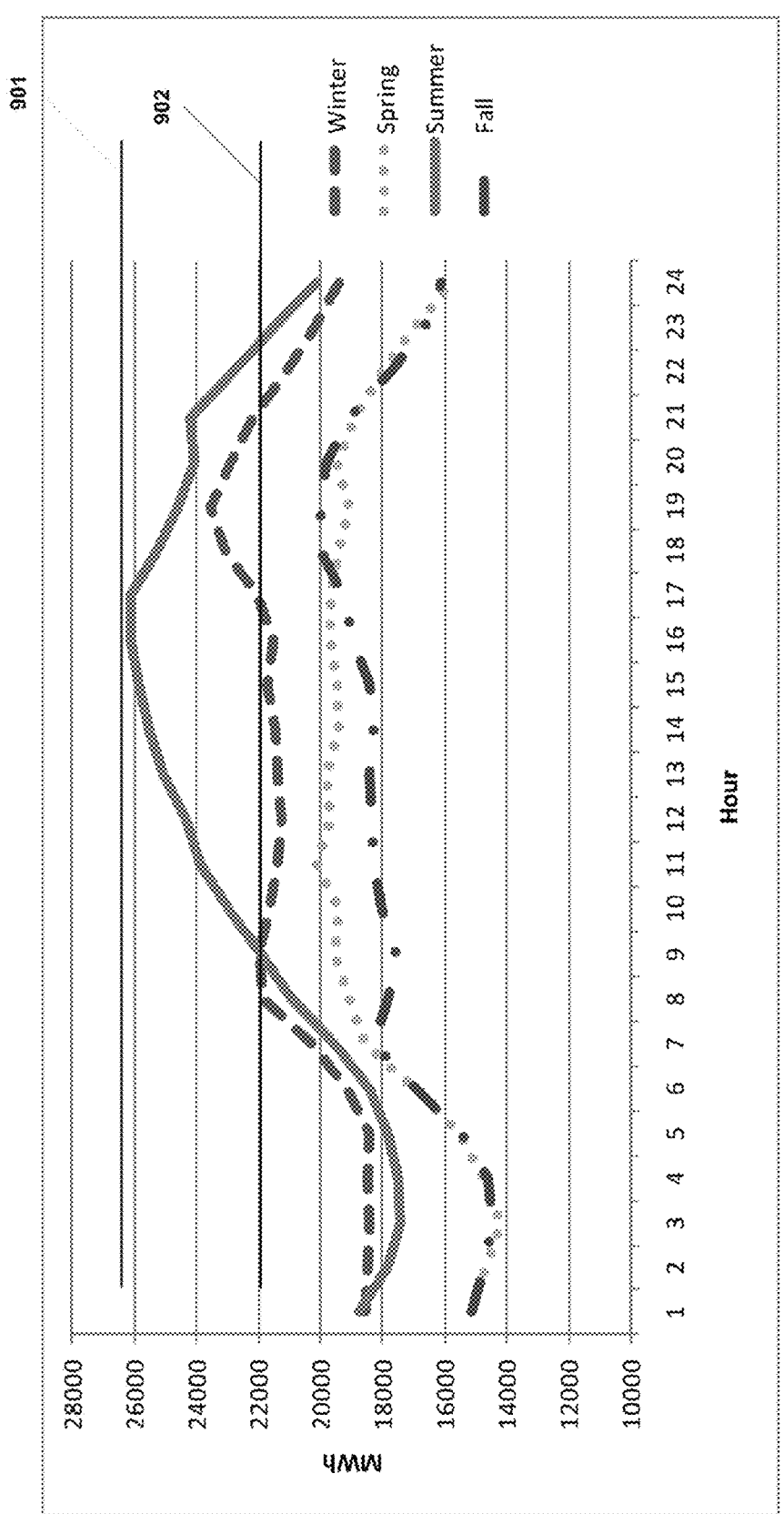
FIG. 9 is an exemplary diagram of average seasonal load for electricity and potential amounts of solar PV capacity.

Based on the profile for each building block, the amount of renewable energy and storage capacity can be "right sized" to maximize return on investment, i.e, deliver the highest ratio of recurring benefits/cost savings to capital cost. FIG. 9 provides some insight on why this is so. Seasonal demand for electricity varies widely, particularly in the Midwestern and Northeastern United States. As the graph shows, electricity consumption is highest in the summer, second highest in winter, and lowest in the spring and fall. This seasonal demand does not comport well with availability of solar, in which output reaches its peak (relative to demand) in spring and fall. Thus, installing enough capacity to meet peak demand in summer 901 would provide an excessive amount of PV capacity for the other three seasons. Conversely, providing just enough PV to satisfy May demand would result in significant undersupply during peak summer months, which would be especially costly in a real-time pricing scheme. The right-amount of PV to provide the best ROI is more in line with a median amount 902, in which excess capacity is spring and fall is minimal and most but not all of peak demand can be accommodated by PV with energy storage available to compensate for the shortfall.

For a defined building in a given location, hourly models of load, renewable energy availability and real-time rates (inclusive of T&D charges) can be established for an entire year (or multiple years). These models can be run through a multi-stage optimization algorithm (1. Charge optimization for arbitrage; 2. Adjustment of charge constraints for the value hierarchy; 3. Discharge optimization for arbitrage; 4. Adjustment of discharge constraints for the value hierarchy) for various capacities (and efficiencies) of renewable energy and storage equipment. Installed costs for the capital equipment can also be ascertained. Executing this multi-stage algorithm for different variations of renewable energy and storage capacity will yield expected annual benefits for a given capital cost. Using the least squares method or equivalent, an optimal quantity of renewable energy and storage capacity for a given building can be determined. Notably, these results are highly contingent upon the T&D charge component of the hourly electricity rate. For example, if the T&D charge is high, the right "mix" of solar and battery capacity would be weighted towards solar, as electricity generated on-site does not incur the T&D charge (whereas electricity purchased from the grid and stored would be). If the T&D charge is low, then the optimal mix would be weighted towards storage, as the carrying cost of acquiring electricity from the grid and storing it for later use is minimal.

Figure 10:
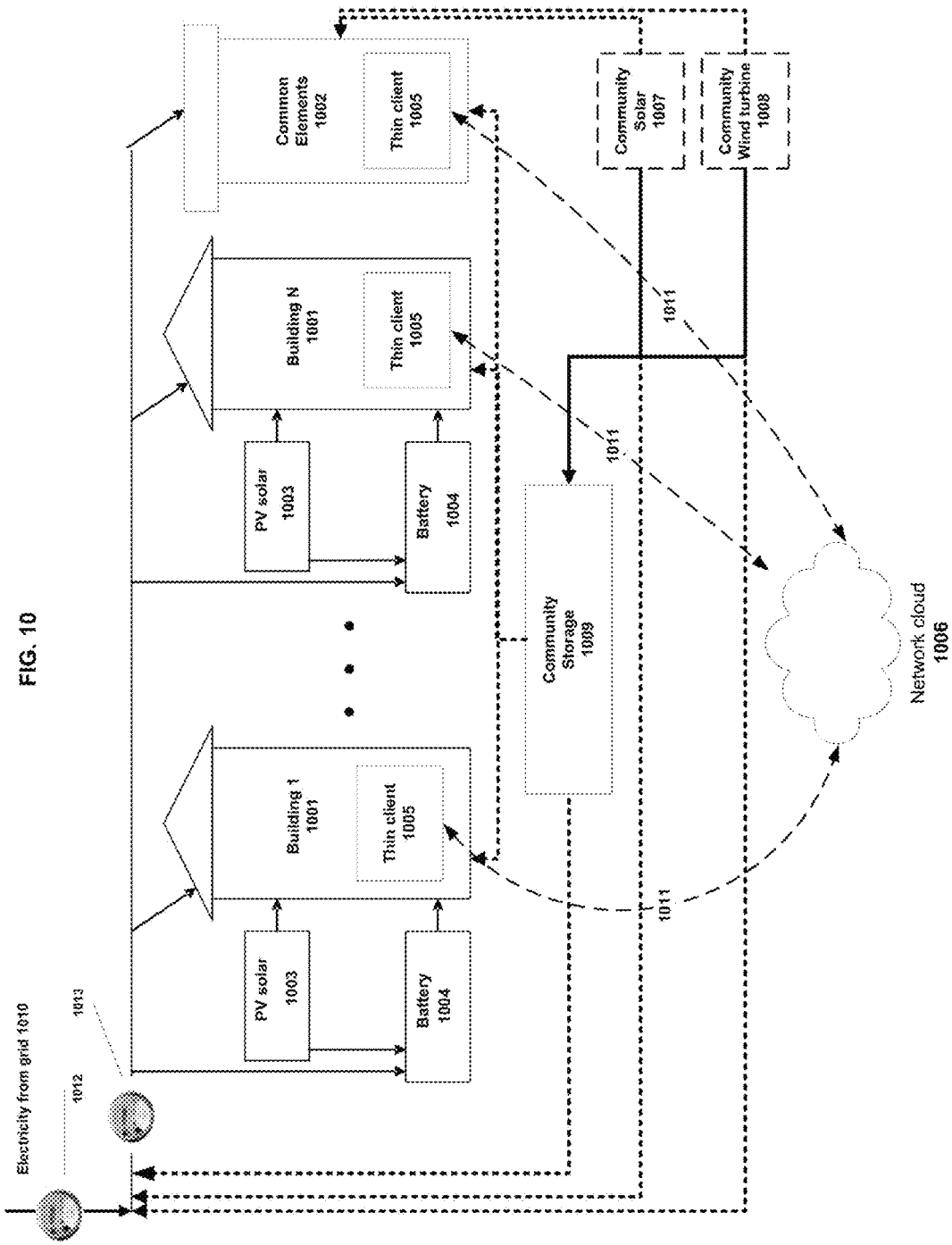
FIG. 10 is an exemplary diagram of variations of how building blocks of the virtual power plant could be scaled at a community level, inclusive of common renewable energy and storage assets.

Each building block of the virtual power plant can be scaled to multiple levels inclusive of common renewable energy and storage assets, as well as combinations of both individual unit/building and common assets. FIG. 10 provides an overview of such a combination, in which a development consists of individual buildings 1001 and common elements with electrical load. Each individual building is equipped with solar panels 1003 and a battery 1004, although in different variations the solar panels and/or battery would not be part of the unit (e.g., a multi-unit mid-rise dwelling). As set forth in FIG. 1, each building (including the common elements) also has a thin-client control/communications gateway device 1005 linked as shown by the dashed line to the network cloud 1006; the thin-client's link to the switch/actuator (typically contained within the battery-based inverter) that controls the flow of electricity and charge/discharge of the battery is not shown. Electricity flow is shown by the bold solid lines. The development also includes common renewable energy sources, which may include a solar PV array 1007 and/or a community wind turbine 1008. These renewable energy assets provide electricity to the common elements 1002 as well as a common energy storage device 1009. In one variation, the common renewable energy assets could also provide electricity directly to the buildings 1001; this would depend on whether the physical connection of electricity from the grid 1010 entailed direct connections to the buildings as part of a "microgrid" setup. In another variation, power from the common renewable energy and storage assets would be fed back into the grid's distribution input for the development.

As was true with the individual building setup in FIG. 1, data/instructions 1011 are measured and transmitted to/from the network cloud 1006. In addition to optimizing each individual building, however, the cloud also contains business rules and a value hierarchy to optimize the development as a whole. These business rules can be set in any number of ways, e.g., to incentivize/reward certain conduct (energy conservation, limiting peak demand, maximizing the development owner's benefits). Benefits can be valued in a hierarchy based on how electricity from the common assets is deployed in relation to what individual buildings are doing. For example, one potential value hierarchy for FIG. 10, inclusive of individual building assets/benefits, common assets/benefits and combined (individual and common assets/benefits) might be:

| Rank | Individual building benefit | Development benefit | Aggregation benefit |
|---|---|---|---|
| 1 | Backup power (static amount) | | |
| 2 | | Backup power (static amount for development) | |
| 3 | | | Ancillary services (voltage regulation; satisfied by both individual building and common assets) |
| 4 | | Capacity charge reduction (common area) | |
| 5 | Capacity charge reduction (individual building) | | |
| 6 | | | Aggregated peak power |
| 7 | | Backup power (dynamic amount for development) | (satisfied by both individual building and common assets) |
| 8 | Backup power (dynamic) | | |
| 9 | | Arbitrage (common area) | |
| 10 | Arbitrage (individual building) | | |
| Varies | Static loads (e.g., PHEV) | | |

The ability to optimize in accordance with this type of hierarchy requires both the individual building data described earlier as well as system-wide data. System-wide electricity is metered at two sources. The first system-wide meter 1012 is "outside" the development and measures only the electricity the utility delivers. The second system-wide meter 1013 is "inside" the delivery of utility from common assets (e.g., community wind turbine, battery) and measures all electricity delivered to the development. Because each unit/building is individually metered, the sum of all individually metered electricity should equal the value recorded in the second system-wide meter 1013; individual customers are typically billed based on what their individual meters (not shown) record. But this billing would be inclusive of stored/renewable energy delivered by the common assets, which is why the utility-delivered electricity quantity measured by the "outside" system-wide meter 1012 is important. The difference between these two values represents the amount of electricity delivered by the development's common assets and can be monetized in various ways, e.g. credit from the utility for self-generation or a power purchase agreement. The allocation of this benefit to the individual unit/building owner can occur according to business rules established by the developer.

Figure 11:
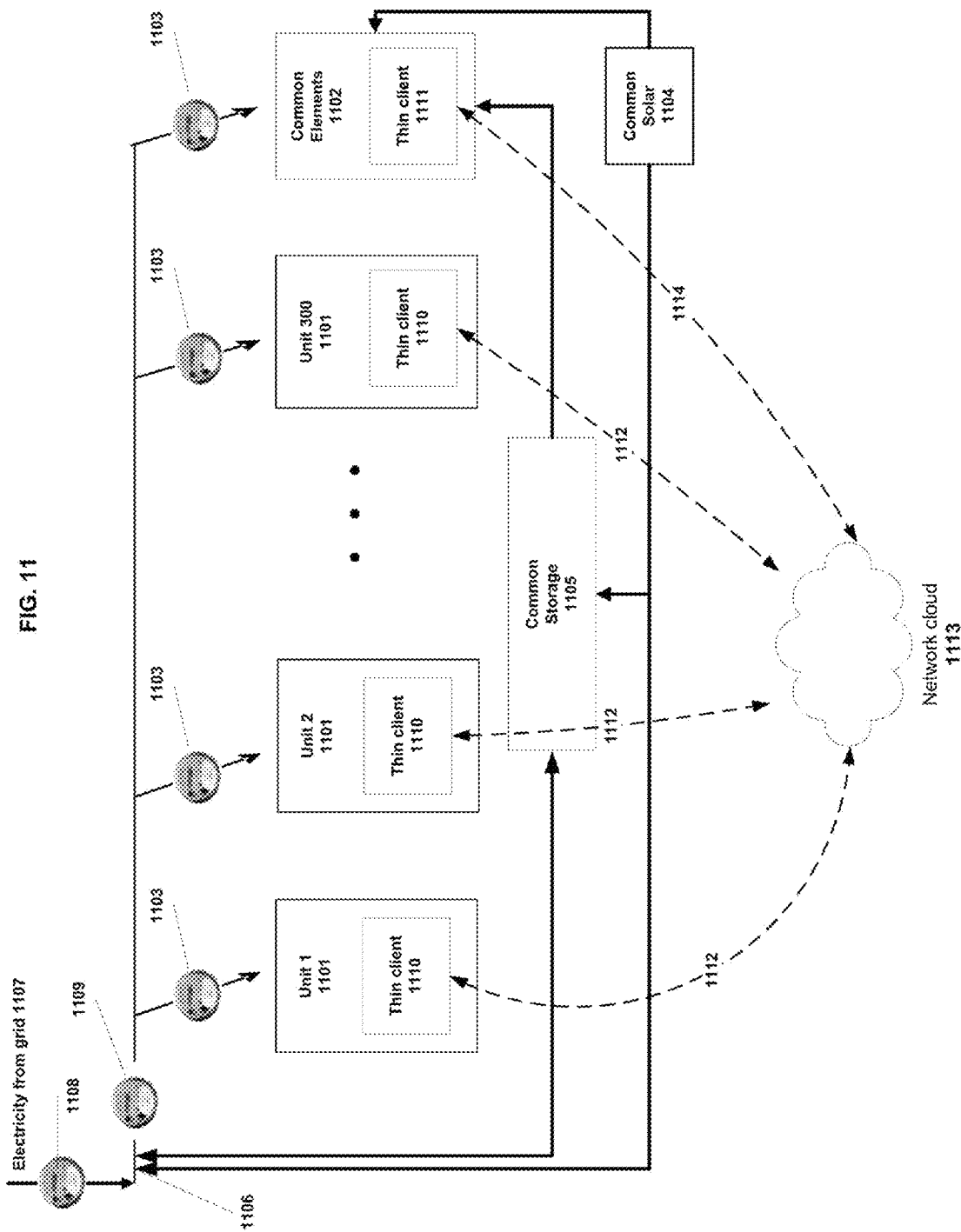
FIG. 11 is a schematic illustration of one variation of the virtual power plant scaled to a community level for a 300-unit mid-rise residential building.

For example, a 300-unit mid-rise condominium building might have the configuration set forth in FIG. 11. None of the condominium units 1101 has individual renewable energy generation or energy storage assets. The building has common elements 1102 that in this example include a garage. Each unit 1101 and the common elements 1102 are individually metered 1103 by the utility. A PV solar array 1104 is mounted on the building's roof and energy storage 1105 (in this case, a large battery) is stored in the garage. The solar array 1104 can provide power directly to at least some of the common area elements 1102 (e.g., the garage), and the common energy storage unit 1105. It can also provide power to the units 1101 by routing back to the building's distribution point from the utility 1107. Similarly, the common energy storage unit 1105 can supply stored power to selected common area elements 1102 or to the units 1101 by routing back to the building's distribution point from the utility 1107. The building, inclusive of units and common area elements, are also powered by electricity from the grid 1107 which is metered in bulk at two points: at 1108, before any electricity supplied by the building's solar array 1104 and/or storage 1105, and at 1109, after the building's renewable generation 1104 and stored electricity 1105 have been routed to satisfy the building's load, inclusive of individual units 1101 and common area elements 1102.

Each unit 1101 has a thin-client control and communications device 1110. Each metered common area element 1102 also has a thin-client gateway device 1111, but the purpose/setup of the thin-client devices between units and common area elements is different. Because condo units do not individually contain renewable energy generation or storage capacity, the thin-client does not convey instructions to optimize acquisition, storage and discharge of electricity in accordance with a value hierarchy for each unit. Instead, each unit's thin-client device 1110 is focused on the load profile and actual consumption for each unit, which provides input 1112 to the cloud network 1113 necessary to optimize in accordance with a value hierarchy for the common solar PV and storage elements as well as the common area load. In this example, one possible value hierarchy might be:

| Rank | Individual unit benefit (Realized by unit owner) | Common area benefit (Realized by developer) | Aggregation benefit (Realized by both) |
|---|---|---|---|
| 1 |  | Backup power for common elements (static amount) |  |
| 2 | Backup power for individual units (static amount) |  |  |
| 3 |  |  | Ancillary services (voltage regulation; satisfied by shifting load from common areas and units from grid to common storage) |
| 4 |  | Capacity charge reduction (common area) |  |
| 5 |  |  | Aggregated peak power (satisfied by both individual building and common assets) |
| 6 | Capacity charge reduction (individual unit) |  |  |
| 7 |  | Backup power (dynamic amount for common area) |  |
| 8 | Backup power (dynamic amount for units) |  |  |
| 9 |  | Arbitrage (common areas) |  |
| 10 | Arbitrage (individual units) |  |  |

As set forth above, the highest priority for storage allocation would be to provide backup power to common area elements to which the battery is directly connected. This could include the stairwells, hallways, garage and perhaps the HVAC system for these areas. To allocate this power in the battery, load could be predicted for these elements and a duration set. The second priority would be to allocate a set amount of backup power for the unit owners. In the event of a blackout, power from the battery would be routed to the common areas as well as the distribution point 1106 for use by unit owners. The next highest priority would be to provide for ancillary service requests from the RTO. In this case, the building has both the common area elements 1102 and the individual units 1101 as candidates for load shifting. Routing of electricity would occur in the same manner as for backup power, described above. Notably, unit owners would not see any difference in their electric bills from the utility, as their individual meters would record the power supplied by the common battery as though it came from the grid. But the building owner/developer would realize substantial benefit from shifting a significant bloc of power from the grid to the battery, which would be measured by the difference in consumption reflected from the "outside" meter 1108 and the "inside" bulk meter 1109. The business rules set up in the cloud could allow for the building owner to allocate the revenues received from the RTO to the unit owners according to whatever criteria the building owner established (e.g., conservation, lowest consumption). Or, the building owner may not choose to share the benefits/revenues with the unit owners at all, as this is power the unit owners would have consumed and been billed for regardless.

The rest of the value hierarchy follows similar logic in terms of the prioritization and sharing of benefits. In that regard, the optimization process for this example would follow the same approach as that outlined in FIG. 8, with adjustments to constraints as dictated by the value hierarchy. This example is one of a myriad of possible arrangements for the inclusion of both individual and common renewable energy and assets as well as load sources, and is not meant to be limiting.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

I claim:

1. A computer-implemented method for distributing electrical energy to a location in an area having an energy storage device and an electrical load, comprising:
    identifying a value hierarchy for the location and at least one other location in the area, the value hierarchy having at least two objectives prioritized relative to one another;
    calculating an objective function based on actual and predicted values, the actual and predicted values each comprising at least one of (1) electricity rates, (2) weather data, and (3) electrical load for the location,
    identifying periodic and aggregate constraints;
    controlling the distribution of electrical energy to the energy storage device for charging based on the objective function; and
    controlling the distribution of electrical energy from the energy storage device for discharging based on the objective function;
    wherein the objective function is optimized for a lowest priority objective in the value hierarchy based on the periodic and aggregate constraints and then optimized using revised periodic and aggregate constraints determined based on at least one objective prioritized above the lowest priority objective in the value hierarchy.

2. The computer-implemented method of claim 1, wherein the objectives of the value hierarchy are selected from the group consisting of:
(a) storing a static quantity of backup power for the location;
(b) storing a dynamic quantity of backup power for the location;
(c) providing voltage regulation and spinning reserve in aggregation with at least one other location;
(d) maximizing peak power supply in aggregation with at least one other location;
(e) limiting grid power demand in aggregation with at least one other location;
(f) capacity charge reduction for the location;
(g) arbitrage for the location; and
(h) storing a static quantity of power for mobile devices coupled to the location.

3. The computer-implemented method of claim 1, wherein at least one of the periodic and aggregate constraints are dynamically revised by the value hierarchy based on immediate requirements.

4. The computer-implemented method of claim 1, wherein at least one of the periodic and aggregate constraints are dynamically revised by the value hierarchy based on predicted requirements.

5. The computer-implemented method of claim 1, wherein controlling the distribution of electrical energy to the storage device is performed by a communication apparatus operatively coupled to a switch control apparatus.

6. The computer-implemented method of claim 5, wherein the communication apparatus directs the switch control apparatus to distribute electrical energy to the energy storage device or to an electrical load of the location from an electrical grid connected to the location or from a renewable energy source connected to the location.

7. The computer-implemented method of claim 6, wherein the energy storage device and renewable energy source are common to the location and at least one other location.

8. The computer-implemented method of claim 5, wherein the communication apparatus communicates with a computing cloud.

9. The computer-implemented method of claim 6, further comprising the step of:
calculating optimal capacities for the renewable energy source and the energy storage device based on periodic model data for renewable energy production, electrical load and electricity rates, wherein an optimal capacity for each of the renewable energy source and the energy storage device is selected according to a least squares method.

10. The computer-implemented method of claim 2, wherein the electrical storage device comprises a plurality of energy storage devices, wherein each of the plurality of storage devices is independently linked to features of the value hierarchy.

11. A system for distributing electrical energy, comprising:
a renewable energy generator configured to generate electricity;
an energy storage device configured to selectively store electricity from an electrical power grid and the renewable energy generator, the energy storage device being configured to supply electricity to a building structure at a location;
a transfer system configured to direct the flow of electricity between the grid, the energy storage device, and the renewable energy generator;
a controller operably coupled to the transfer system and configured to direct the transfer system to permit the flow of electricity to and from the energy storage device, the controller also being configured to determine when electricity from the renewable energy generator and power grid are to be used to power the building structure or charge the energy storage device based upon an objective function subject to periodic and aggregate constraints determined at least in part based on a value hierarchy for the location and at least one other location in the area and at least in part based on actual and predicted values, the value hierarchy having at least two objectives prioritized relative to one another, the actual and predicted values each comprising at least one of (1) electricity rates, (2) weather data, and (3) electrical load for the location,
wherein the objective function is optimized for a lowest priority objective in the value hierarchy based on the periodic and aggregate constraints and then optimized using revised periodic and aggregate constraints determined based on at least one objective prioritized above the lowest priority objective in the value hierarchy.

12. The system of claim 11, wherein the objectives of the value hierarchy are selected form the croup consisting of:
(a) storing a static quantity of backup power for the building structure;
(b) storing a dynamic quantity of backup power for the building structure;
(c) providing voltage regulation and spinning reserve in aggregation with at least one other building structure;
(d) maximizing peak power supply in aggregation with at least one other building structure;
(e) limiting grid power demand in aggregation with at least one other building structure;
(f) capacity charge reduction for the building structure;
(g) arbitrage for the building structure; and
(h) storing a static quantity of power for mobile devices coupled to the building structure.

13. The apparatus of claim 11, wherein the controller, when a signal is received from the power grid, directs at least a portion of the electricity stored in the battery to the building structure to replace a portion of the energy received from the electrical power grid to reduce the demand placed on the electrical power grid for electricity.

14. The apparatus of claim 13, wherein the controller is configured to direct electricity generated by the renewable energy generator not consumed by the building structure to charge the energy storage device.

15. The apparatus of claim 14, wherein the measured values are selected from the group consisting of metered consumption from the grid, power output from the renewable energy generator, total load of the building structure, and storage capacity.

16. The apparatus of claim 15, wherein the predicted values are selected from the group consisting of market electricity rates, ambient temperature, building load, weather data, and predicted power output from the renewable energy generator.

17. A computer-implemented method for optimizing the acquisition, storage and consumption of electrical energy in an energy storage device at a location where the electrical energy is consumed, comprising:
identifying a value hierarchy for a network of locations including the location, the value hierarchy including at least two objectives prioritized relative to one another;
calculating an objective function based on actual and predicted values for electricity rates and charges for each location in the network of locations;

identifying periodic and aggregate constraints for each location in the network of locations;

identifying an optimized solution for charging or discharging the energy storage device at the location based on the optimized objective function for the location; and charging or discharging the energy storage device at the location based on the optimized solution;

wherein the objective function is optimized for a lowest priority objective in the value hierarchy based on the periodic and aggregate constraints and then optimized for each location using revised periodic and aggregate constraints determined based on at least one objective prioritized above the lowest priority objective in the value hierarchy such that a benefit to the network of locations is maximized by each location.

18. The computer-implemented method of claim 17, wherein the objectives of the value hierarchy are selected from the group consisting of:
(a) storing a static quantity of backup power for the location;
(b) storing a dynamic quantity of backup power for the location;
(c) providing voltage regulation and spinning reserve in aggregation with at least one other location;
(d) maximizing peak power supply in aggregation with at least one other location;
(e) limiting grid power demand in aggregation with at least one other location;
(f) capacity charge reduction for the location;
(g) arbitrage for the location; and
(h) storing a static quantity of power for mobile devices coupled to the location.

19. The computer-implemented method of claim 17, wherein at least one of the periodic and aggregate constraints are dynamically revised based on immediate requirements.

20. The computer-implemented method of claim 17, wherein at least one of the periodic and aggregate constraints are dynamically revised based on predicted requirements.

21. The computer-implemented method of claim 17, wherein the optimized solution is performed to minimize total energy cost at another location.

22. The computer-implemented method of claim 21, wherein charging and discharging the storage device is performed by a communication apparatus operatively coupled to a switch control apparatus.

23. The computer-implemented method of claim 22, wherein the communication apparatus directs the switch control apparatus to distribute electrical energy to the energy storage device or to an electrical load of the location from an electrical grid connected to the location or from a renewable energy source connected to the location.

24. The computer-implemented method of claim 23, further comprising the step of:
calculating optimal capacities for the renewable energy source and the energy storage device based on periodic model data for renewable energy production, electrical load, and electricity rates, wherein an optimal capacity for each of the renewable energy source and the energy storage device is selected according to a least squares method.

25. The computer-implemented method of claim 17, wherein the periodic constraints are identified for each hour in a 24-hour period.

26. The computer-implemented method of claim 25, wherein at least one periodic constraint comprises the lesser of:
a charge rate of the energy storage device minus a predicted amount of excess electricity provided by a renewable energy source at the location, or
an available unused capacity of the energy storage device for an identified period.

27. The computer-implemented method of claim 26, wherein at least one aggregate constraint comprises the sum of the periodic constraints for all 24 hours in the 24-hour period being greater than or equal to the lesser of:
a cumulative load for all hours in the 24-hour period in which electricity can be stored and used profitably,
a total daily consumption of the location, or
a current available capacity of the energy storage device minus a cumulative amount of predicted excess capacity from the renewable energy source during the 24-hour period.

* * * * *